(12) United States Patent
White et al.

(10) Patent No.: US 12,320,656 B2
(45) Date of Patent: Jun. 3, 2025

(54) CONDITIONAL REGION-BASED COSTING IN CONTRACTION HIERARCHIES

(71) Applicant: Verizon Patent and Licensing Inc., Basking Ridge, NJ (US)

(72) Inventors: Hayden Sean White, Kaiapoi (NZ); Nathan M. Robinson, Christchurch (NZ); Hughan J. Ross, Christchurch (NZ)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 524 days.

(21) Appl. No.: 17/673,888

(22) Filed: Feb. 17, 2022

(65) Prior Publication Data

US 2023/0258462 A1 Aug. 17, 2023

(51) Int. Cl.
*G01C 21/34* (2006.01)

(52) U.S. Cl.
CPC ..... *G01C 21/3461* (2013.01); *G01C 21/3446* (2013.01)

(58) Field of Classification Search
CPC  G01C 21/34; G01C 21/3446; G01C 21/3453; G01C 21/3461
See application file for complete search history.

(56) References Cited

U.S. PATENT DOCUMENTS

| | | | | |
|---|---|---|---|---|
| 8,886,453 | B2* | 11/2014 | Cerecke | G06Q 10/04 701/422 |
| 2012/0158299 | A1* | 6/2012 | Cerecke | G01C 21/3469 701/533 |

* cited by examiner

*Primary Examiner* — Justin R. Blaufeld

(57) ABSTRACT

A system may perform a search from a source node of a node map to a target node of the node map. Performing the search may include identifying a first path, starting at the source node, that enters a particular constraint region, and identifying a second path, starting at the source node, that does not enter the particular constraint region. The system may select the second path as a path from the source node to the target node, based on identifying that the first path enters the particular constraint region and that the second path does not enter the particular constraint region. The system may cease exploring nodes via the first path when the second path is identified as reaching the target node, and not including a constraint associated with the particular constraint region.

20 Claims, 21 Drawing Sheets

CONDITIONAL REGION-BASED COSTING IN CONTRACTION HIERARCHIES

BACKGROUND

Navigation systems may have the ability to generate turn-by-turn navigation directions from arbitrary starting points to arbitrary destinations. Some systems may precompute directions for commonly traveled routes using contraction hierarchies or other similar techniques, in which a set of turns, paths, or the like are contracted into a single "shortcut" that represents the turns, paths, etc. Such precomputed shortcuts may be used when generating particular navigation instructions at "query" time from a particular starting point to a particular destination, thus saving time and processing resources that would be expended after the query is received.

DETAILED DESCRIPTION OF EXAMPLE EMBODIMENTS

Figure 1:
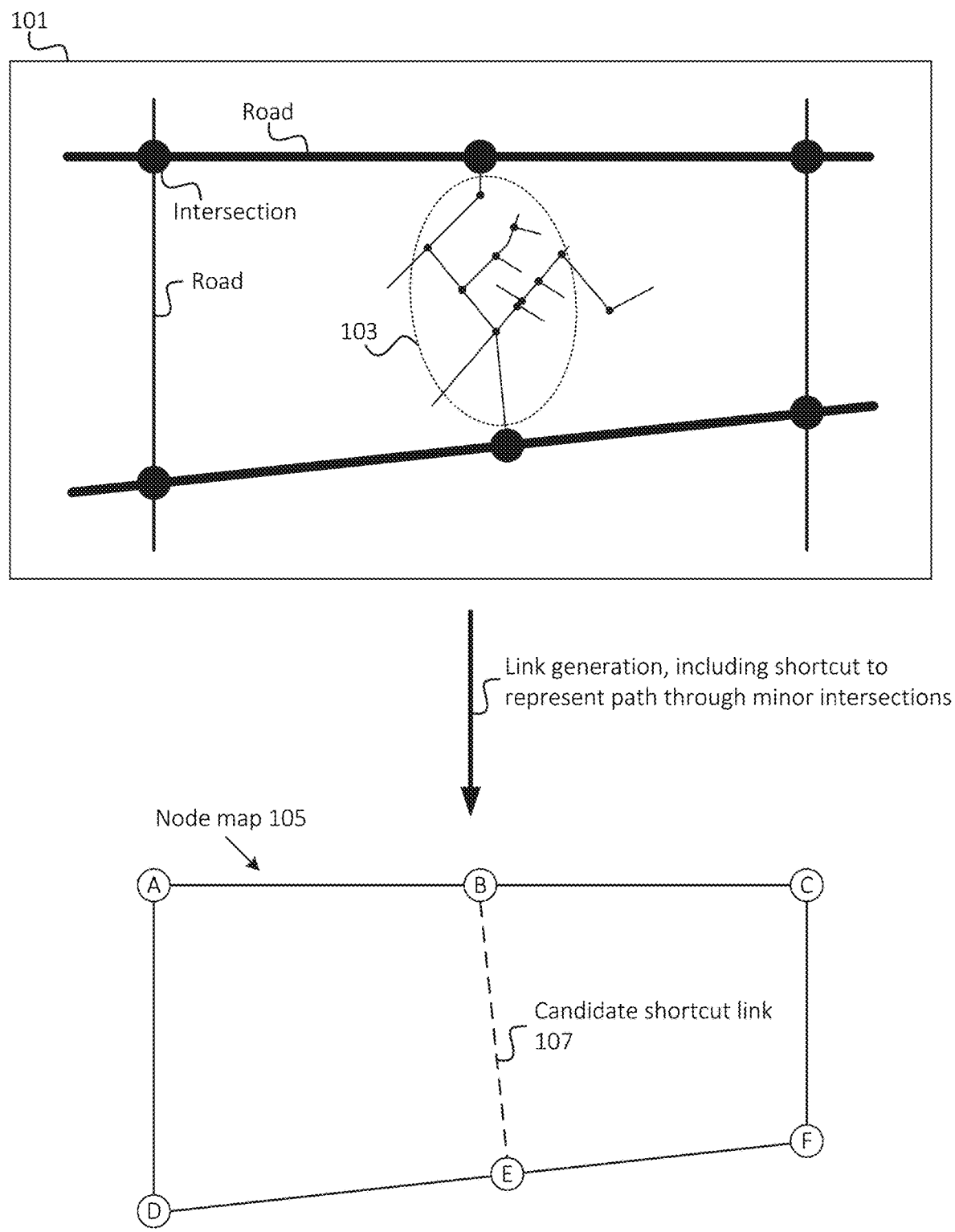
FIG. 1 illustrates an example generation of nodes and links, including a shortcut link that represents a path through multiple nodes, that are based on a set of physical roads and intersections.

The following detailed description refers to the accompanying drawings. The same reference numbers in different drawings may identify the same or similar elements.

Embodiments described herein provide for the identification of constraints on particular links or nodes in a node map, and the selective generation of shortcut links based on such constraints. For example, the node map may include nodes, which may represent intersections, landmarks, markers, locations, addresses, tunnel entrances or exits, or other objects or indicators. The node map may also include links between respective nodes. In some instances, one or more links may represent one or more roads, and nodes may represent intersections between roads, road signs, zone markers (e.g., the entrance or exit to a school zone, a construction zone, a tunnel, a bridge, etc.), or other objects associated with roads.

The node map may include precomputed "shortcut" links between some nodes, where a shortcut link represents multiple links between multiple nodes. The shortcut link may be added to the node map (e.g., may replace the component nodes and links in the node map, and/or may be added in addition to the component nodes and links), such that when the node map is used for a solution to a query (e.g., a shortest path solution, a lowest cost solution, a set of navigation instructions in response to a navigation request, or the like), the shortcut link may be used in lieu of computing a path through the component nodes and links of the shortcut link. The navigation instructions may, for example, be generated or used by a fleet management system, which may provide navigation instructions to various vehicles in one or more fleets. Such fleets may include fleets of delivery vehicles, personnel transport vehicles, buses, rideshare vehicles, or the like. In some embodiments, the navigation instructions may be generated or utilized by personal navigation systems, such as navigation systems installed in an individual's automobile or mobile device.

While adding shortcut links to a node map may reduce processing time and/or resources when the node map is evaluated for a query, the size of the node map (e.g., size of computer files associated with the node map, size of one or more data structures associated with the node map, or the like) may increase to an unmanageable size if too many shortcuts are added. The larger size of the node map may consume a relatively large amount of storage resources, and/or may end up slowing down processing at query time due to the potentially larger data set to be evaluated at query time. Further, the processing time and/or resources to generate a node map may be relatively intensive, and adding excessive or unnecessary shortcut links to the node map may make the node map generation process (e.g., using conditional hierarchies) burdensome or unfeasible depending on hardware constraints. Thus, while it may be useful to include shortcut links in the node map when such shortcut links may be used for queries, limiting the quantity of shortcut links based on some criteria may provide better performance than adding more than a predetermined or dynamic number of shortcut links.

Further, some links may be associated with constraints, which may or may not apply to some queries. For example, in a situation where links on a node map represent roads that may be taken by a vehicle, one link may be associated with a road associated with a bridge, tunnel, or other feature that has constraints on parameters of vehicles that may safely traverse the road. Such constraints may include a height constraint (e.g., a maximum height), a weight constraint, a quantity of axles constraint, or the like. Thus, situations may arise where a given link, such as a shortcut link, is a better fit for some vehicles, but not necessarily all vehicles.

Further, situations may arise where a series of links may be associated with the same constraint or set of constraints (e.g., the same maximum height, the same maximum weight, etc.). Embodiments described herein may define "constraint regions" that include a series of links with the same constraint or set of constraints. The use of constraint regions may provide for the appropriate computation of a cost associated with a path that traverses multiple links with the same constraint or set of constraints. For example, as discussed below, when a path traverses multiple links that are in the same constraint region, the constraint may be applied to the cost of the path once, rather than for each link in the path. In other words, a system may, in some embodiments, forgo applying a constraint cost associated with a link, if a previously traversed link (e.g., an immediately previously traversed link) is also associated with the same constraint. Thus, the constraint cost may not be incurred again, as the constraint was already applicable in the previously traversed link. Further, as discussed below, identifying a path's entry (e.g., a turn) into a constraint region may be used to prune a search or exploration technique from a source node to a target node, in order to reduce the amount of processing resources and/or time that would be used to perform such search or exploration techniques. For example, certain searches and/or explorations may not be necessary when entering a constraint region, thus saving processing resources and/or time.

As shown in FIG. 1, map 101 may represent a set of roads and intersections between the roads. In this figure, the intersections are denoted by filled circles on map 101. Map 101 may also include a set of "minor" roads 103. For example, each road and/or intersection may be associated with a score or other measure of "importance," which may be based on factors such as road size, road length, amount of traffic traveling on the road, and/or other attributes.

Some embodiments may generate node map 105 based on map 101 (e.g., based on the roads and/or intersections depicted in map 101), which may include the generation of one or more links representing roads and nodes representing intersections. Further, node map 105 may include one or more shortcut links. In the example here, candidate shortcut link 107 may represent the set of minor roads 103 depicted in map 101. Candidate shortcut link 107 may be determined using contraction hierarchy techniques (e.g., in which minor roads 103 are determined to be candidates for contraction into a shortcut link). For example, candidate shortcut link 107 may be determined based on measures of importance of minor roads 103. Candidate shortcut link 107 may be a "candidate" shortcut link in that embodiments described herein may determine whether candidate shortcut link 107 should ultimately be included in node map 105 or omitted. For example, as discussed below, some embodiments may evaluate constraints associated with candidate shortcut link 107 and one or more other links or paths between links to determine whether potential situations may exist where candidate shortcut link 107 is included in an appropriate path for a potential query, and/or where candidate shortcut link 107 is not included in an appropriate path for other potential queries.

Figure 2:
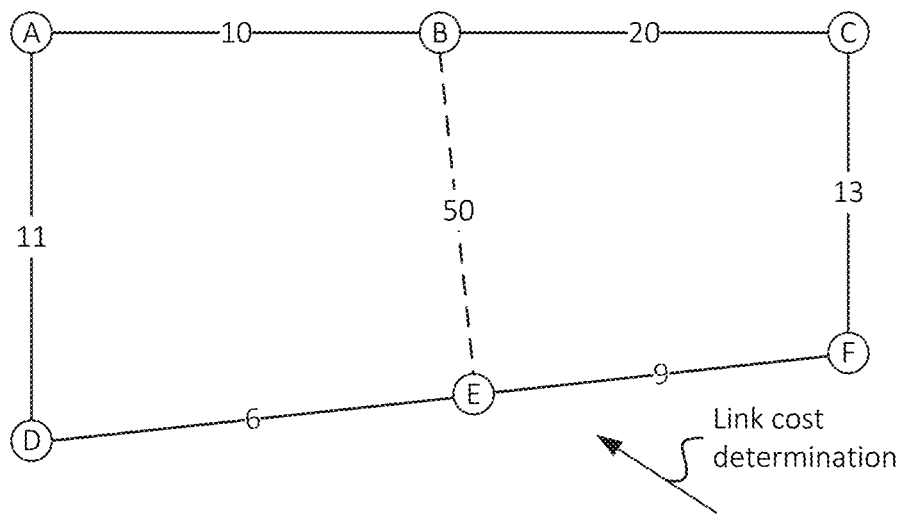
FIG. 2 illustrates example "costs" associated with the example links.

As noted above, and as shown in FIG. 2, each link may be associated with a "cost," which may represent time spent traversing the link, resources spent traversing the link (e.g., fuel in situations where the link represents a physical road, electricity in situations where the link represents a pipeline through which fluid is pumped, etc.), or other suitable metrics that may be reflected by a cost, score, or the like. For example, as shown in FIG. 2, the cost of the link between Node A and Node B (referred to herein using the notation "Link(AB)") is 10, the cost of Link(BC) is 20, the cost of candidate shortcut link 107 (e.g., Link(BE)) is 50 and so on.

Figure 3:
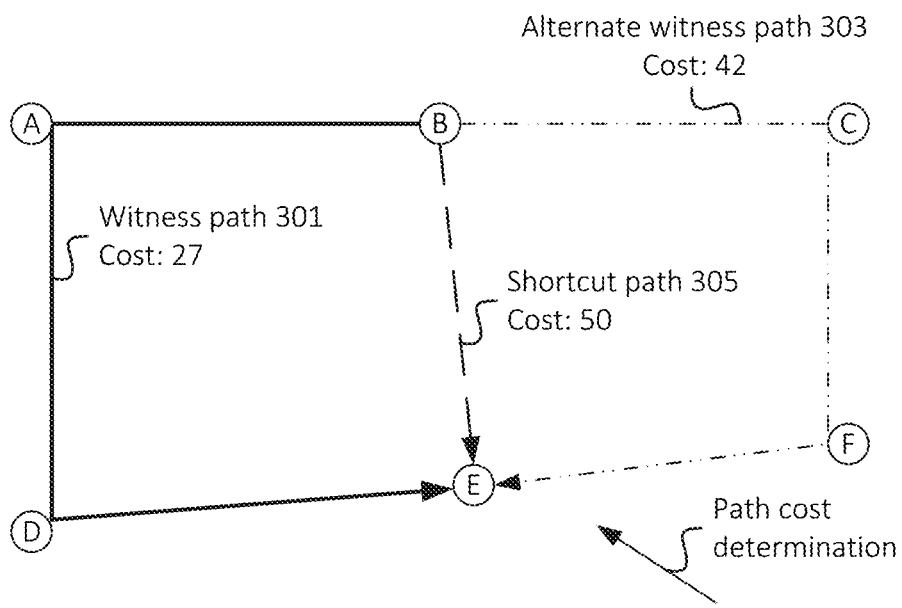
FIG. 3 illustrates an example identification of "witness" paths that serve as lower cost alternatives to a path through the shortcut link.

As shown in FIG. 3, contraction hierarchy techniques may include the determination of whether one or more "witness paths" exist for candidate shortcut link 107. For example, several paths from Node B to Node E are determined. As referred to herein, a "path" includes a starting node, an ending node, and one or more links. One or more of the paths, referred to herein as a "shortcut paths," may include only candidate shortcut link 107. For example, in some situations, shortcut link 107 may be a link between a first node and a second node, and a first shortcut path may be a path from the first node to the second node, while a second shortcut path may be a path from the second node to the first node. Further, one or more "witness paths" may be identified, where a witness path refers to a path through the node map that has the same starting node and ending node as a shortcut path (or candidate shortcut path), and that also has a lower cost than the shortcut path. In some embodiments, a witness path may not include a shortcut link. In the example of FIG. 3, the shortcut path includes only Link (BE)—that is, a path directly from Node B to Node E. In practice, similar concepts may apply when evaluating a path in the other direction along Link(BE), which may be a path directly from Node E to Node B.

In some embodiments, candidate shortcut links may be evaluated in a unidirectional manner. For example, in some embodiments, a candidate shortcut link may be added to the node map if the evaluation of the candidate shortcut link, as described herein, only indicates that the shortcut link applies in one direction (but not all directions). For the sake of brevity, only one direction (i.e., from Node B to Node E) is described herein.

In this example, witness path 301, which traverses Node B, Node A, Node D, and then Node E (referred to herein using the notation "Path(BADE)") may have a cost of 27. That is, Path(BADE) may have component links Link(BA), Link(AD), and Link (DE). Referring to the example costs shown in FIG. 2, the respective link costs of these links are 10, 11, and 6, resulting in path cost of 27 for witness path 301 (10+11+6). In the examples herein, path costs are computed by adding link costs of component links. In practice, other techniques for computing paths costs may be used.

In the examples herein, path costs are computed by adding link costs of component links. In practice, other techniques for computing paths costs may be used. Further, in this example, it is assumed that link costs apply in both directions. In practice, links may have different costs for different directions, and similar concepts may be applied when evaluating such links in different directions. For example, in some scenarios, Link(AB) may have a cost of 10 in one direction, and a cost of 15 in the other direction. In other words, Path(AB) may have an example path cost of 10, while Path(BA) may have an example path cost of 15. In such scenarios, a path cost may be computed by adding path costs of component paths. For example, the cost of Path(BADE) may be based in part on the path cost of Path(BA), but not based on the path cost of Path(AB).

Continuing with the example of FIG. 3, alternate witness path 303, which traverses Path(BCFE), may have a path cost of 42, and shortcut path 305 may have a path cost of 50 (e.g., the same cost as Link(BE) or of Path(BE), in situations where Path(BE) and Path(EB) have different costs). Thus, as witness path 301 and alternate witness path 303 each have a lower cost than shortcut path 305, witness path 301 and alternate witness path 303 may be considered as valid witness paths for shortcut path 305. That is, as similarly noted above, witness path 301 and alternate witness path 303 may each share the same start and end points with shortcut path 305, and may each be associated with a lower cost than shortcut path 305. Alternate witness path 303 may be an "alternate" witness path, in that the cost of alternate witness path 303 is lower than witness path 301. In some embodiments, only one witness path may be determined. For example, processing may continue evaluating other candidate shortcut links once a witness path is found for shortcut path 305. In some embodiments, multiple witness paths may be attempted to be found for a given shortcut link.

Generally, a determination of at least one witness path for a shortcut link (e.g., for one or more shortcut paths that include the shortcut link, which may include different directions of traversing the same link) may indicate that the shortcut link should be omitted from the node map. For example, the determination of the witness path may indicate that the shortcut link is unlikely to ever be used (or will never be used) for a query, as the witness path is by definition a lower cost than the shortcut link. However, as noted above, situations may arise in which constraints associated with a witness path may make the witness path untraversable for some queries, while being traversable for other queries.

Figure 4:
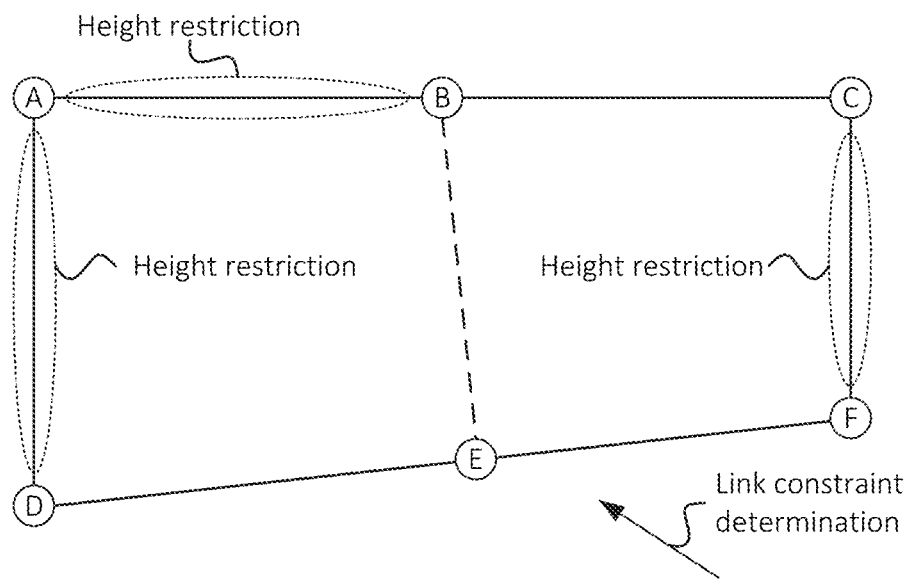
FIG. 4 illustrates example constraints that may be associated with particular ones of the example links.

For example, in embodiments where the node map corresponds to a system that provides navigation instructions, some queries may include vehicle attributes such as height, weight, quantity of axles, hazardous material cargo, and/or other attributes. Further, constraints on particular links, such as links included in one or more witness paths for one or more shortcut links, may include constraints or restrictions on such attributes. For example, as shown in FIG. 4, Link(AB) may be associated with a vehicle height restriction, such as a restriction of 6 meters or some other height. Link(AD) and Link(CF) may also be associated with the height restriction (e.g., the same height restriction or a different height restriction). As similarly noted above, the constraints may apply in a bidirectional manner. In some embodiments, the constraints may apply in a unidirectional manner. For example, assume that Link(AB) is associated with a maximum width restriction, while Link(BA) is not associated with the width restriction (e.g., the same section of road may be narrower in one direction than the opposite direction).

In practice, multiple-criteria constraints, which may include Boolean or other logical operators or functions, may be applied. Further, constraints may be based on any suitable factor in lieu of, or in addition to, maximum height. For example, a link may be associated with a maximum height and a maximum weight (e.g., using a logical "AND" operator). As another example, a link may be associated with a maximum weight or a maximum quantity of axles (e.g., using a logical "OR" operator).

Figure 5:
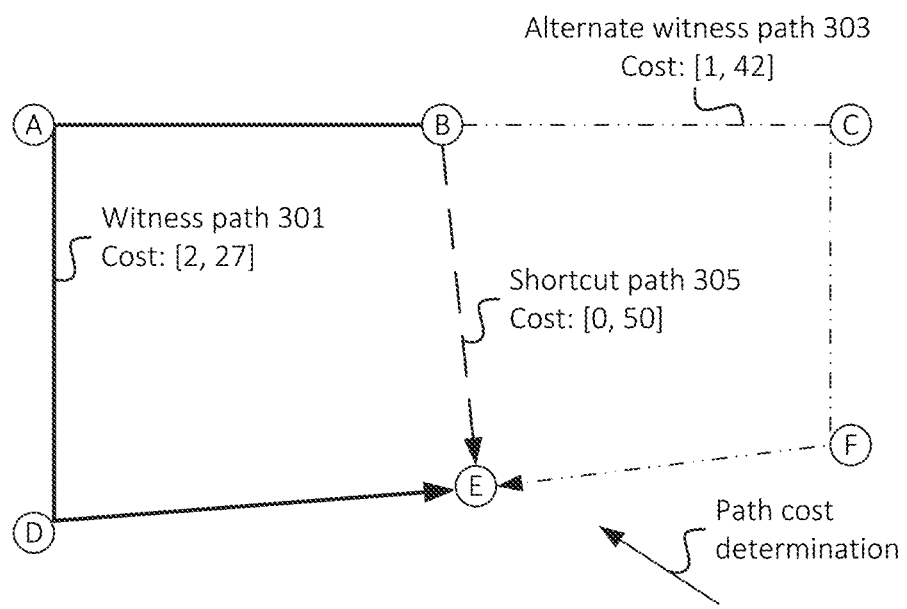
FIGS. 5-7 illustrates examples of determining costs associated with particular paths that include constraints based on a quantity of constrained links traversed.

As shown in FIG. 5, the costs of paths 301, 303, and/or 305 may include an indication of a quantity of constraints identified with respect to each path (e.g., a quantity of links with constraints). As shown, for example, witness path 301 may be associated with a cost of 27, as discussed, above, as well as a "2" to denote that two links of witness path 301 (i.e., Link(BA) and Link(AD)) are each associated with a constraint. As such, the cost of witness path 301 may be denoted as "[2, 27]." Similarly, alternate witness path 303 may be associated with a cost of [1, 42], denoting that alternate witness path 303 includes one link with a constraint (e.g., Link(CF)) and otherwise has a total cost of 42. Further, shortcut path 305 may be associated with a cost of [0, 50], denoting that shortcut path has no links with constraints and otherwise has a total cost of 50.

In this example, it may be apparent that although witness path 301 includes two links with constraints, the constraint would not be violated any further when entering Link(AD) from Link(BA). For example, assuming that the constraint includes a maximum height restriction for a truck, the truck would have violated the maximum height restriction when entering Link(BA), and would continue violating this restriction when entering Link(AD), rather than incurring a new violation. For example, entering Link(AD) may, from the perspective of determining whether the constraint has been violated, be the same as traveling along Link(BA). As such, as discussed herein, the violation of this constraint may be counted once rather than twice, in order to more accurately reflect the effects of violating the constraint that spans multiple contiguous links.

Figure 6:
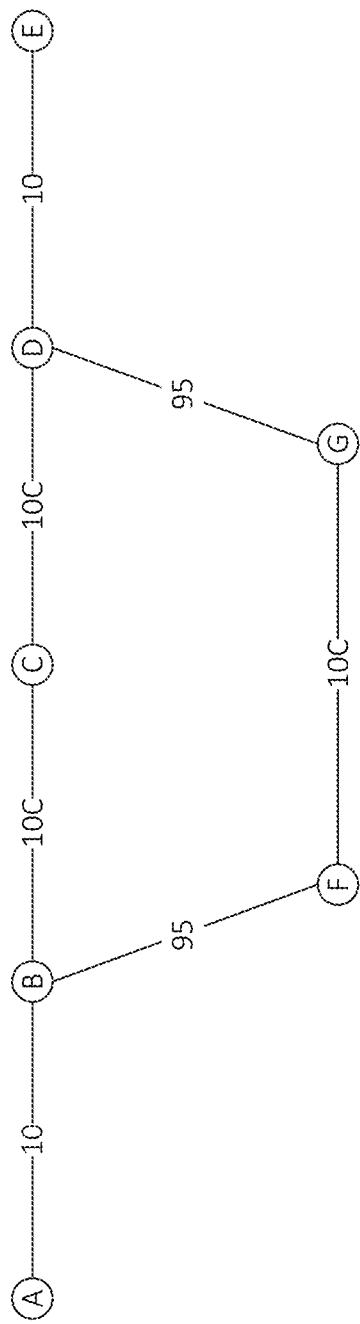

FIG. 6 illustrates an example of links between respective nodes, where some of the links are associated with a particular constraint (denoted by a "C" overlaid on such links) that would be violated given certain conditions. Assume, for example, that the examples described herein are in the context of a constraint that would be violated by a vehicle that is traversing the links and/or paths described herein, such as a truck or fleet vehicle for which navigation instructions are generated. Further assume, in this example and in subsequent examples, that the constraints for multiple links are the same constraint (e.g., the same height restriction, the same weight restriction, etc.).

As reflected in data structure 601, Link(AB) may be associated with a cost of 10 and may not be associated with the constraint, Link(BC) may be associated with a cost of 10 and may be associated with the constraint (denoted in the figure as "10C" overlaid on Link(BC)), Link(BF) may be associated with a cost of 95 and may not be associated with the constraint, and so on.

Figure 7:
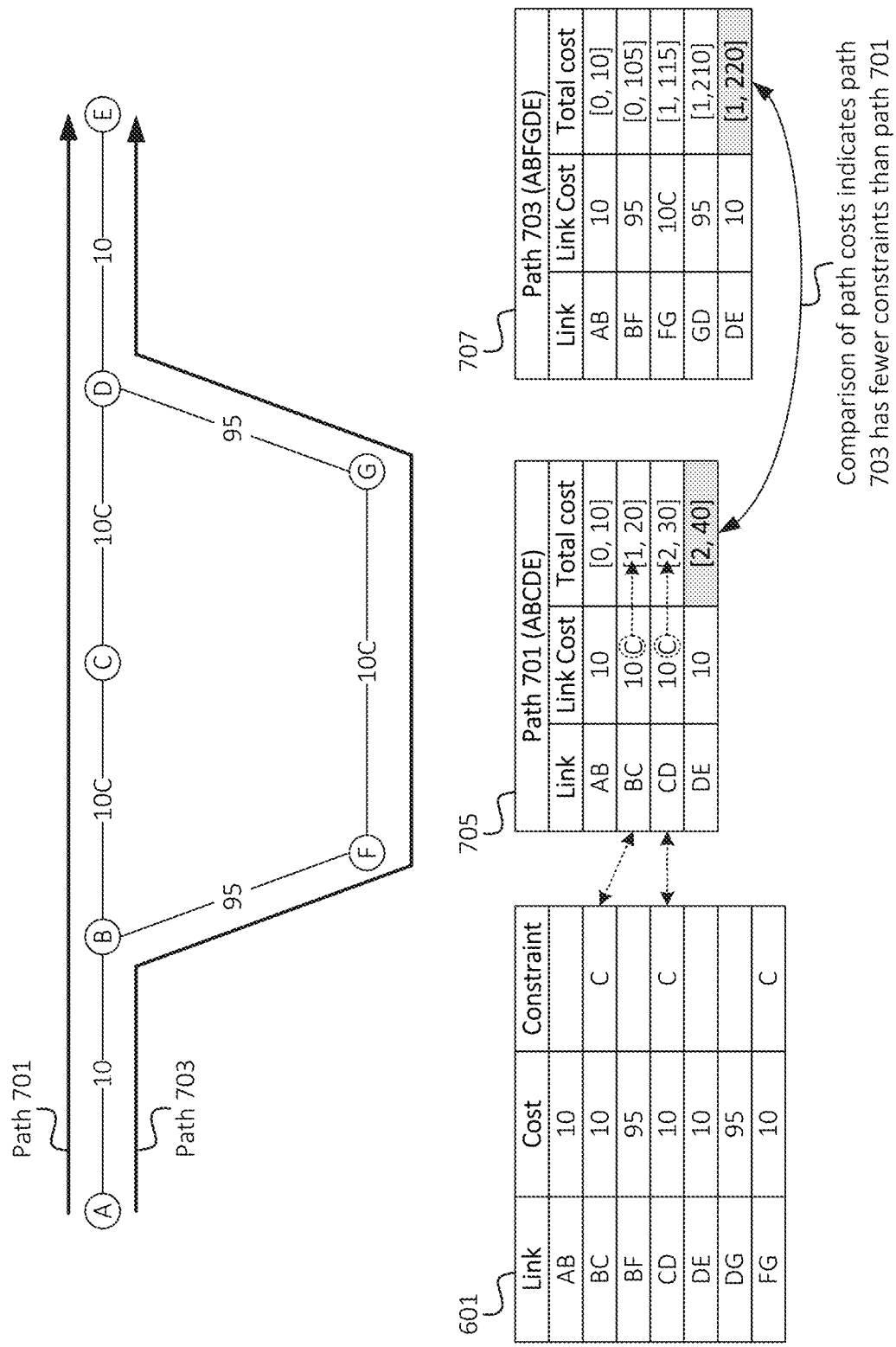

FIG. 7 illustrates a determination of costs of example paths 701 and 703 from Node A to Node E, where such path costs include an indication of the quantity of constrained links traversed via such paths. As reflected in data structure 705, for example, path 701 (e.g., Path(ABCDE)) may be associated with a cost of [2, 40]. For example, as discussed above, the "2" in this cost may refer to the quantity of constrained links included in path 701, where such links include Link(BC) and Link(CD). As reflected in data structure 707, path 703 (e.g., Path(ABFGDE)) may be associated with a cost of [1, 220].

Thus, in one manner of path selection, path 703 may be determined as being more optimal, more desirable, lower cost, etc. than path 701. For example, according to such techniques, path 703 may be selected based on having fewer constrained links (i.e., one constrained link) than path 701 (i.e., two constrained link), even though the cost is otherwise higher for path 703. However, as noted above, the quantity of contiguous constrained links may not, in actuality, be indicative of the nature of violating multiple constraints. For example, violating multiple contiguous instances of the same constraint may have the same, or similar, effect as violating the first instance of the constraint. The resulting solution, when evaluating path costs based on the quantity of constraints violated, may thus suggest that path 703 is optimal when compared to path 701, even though in actuality path 703 may be less optimal due to having a higher cost and also including the same violated constraint as path 701.

Figure 8:
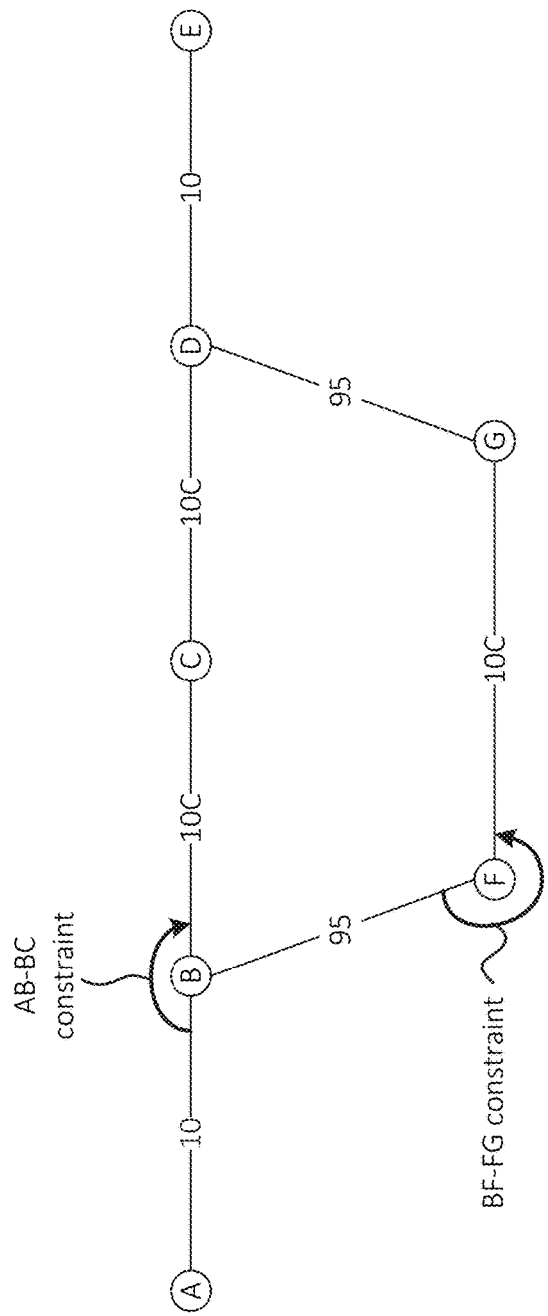
FIG. 8 illustrates an example of associating turns into constraint regions with a constraint cost, in accordance with some embodiments.

In accordance with some embodiments, as shown in FIG. 8, constraint costs may be added to turns, transitions, entries, etc. (referred to herein simply as "turns") onto links that include a constraint that is not included on a previous link. For example, as reflected in data structure 801, a turn from Link(AB) to Link(BC) may be associated with a constraint cost, as turning onto or entering Link(BC) from Link(AB) incurs a constraint that was not present on Link(AB). Referring, for example, to data structure 601, Link(AB) does not have the constraint "C" while Link(BC) does have the constraint "C." Similarly, as also reflected in data structure 801, a turn from Link(BF) to Link (FG) may be associated with a constraint cost, as Link(BF) is not associated with the constraint while Link(FG) is associated with the constraint. On the other hand, as further reflected in data structure 801, other turns between other links may not be associated with a constraint cost. In particular, for example, Link(BC) to Link(CD) may not be associated with a constraint cost, even though Link(BC) and Link(CD) are each associated with a constraint. For example, in accordance with some embodiments, as noted above, Link(CD) may not include an additional as compared to Link(BC), and therefore entering Link(CD) from Link(BC) may not incur a constraint cost. As discussed below, Link(BC) and Link(CD) may be referred to as a "constraint region," which may include a set of contiguous links with the same constraints.

Figure 9:
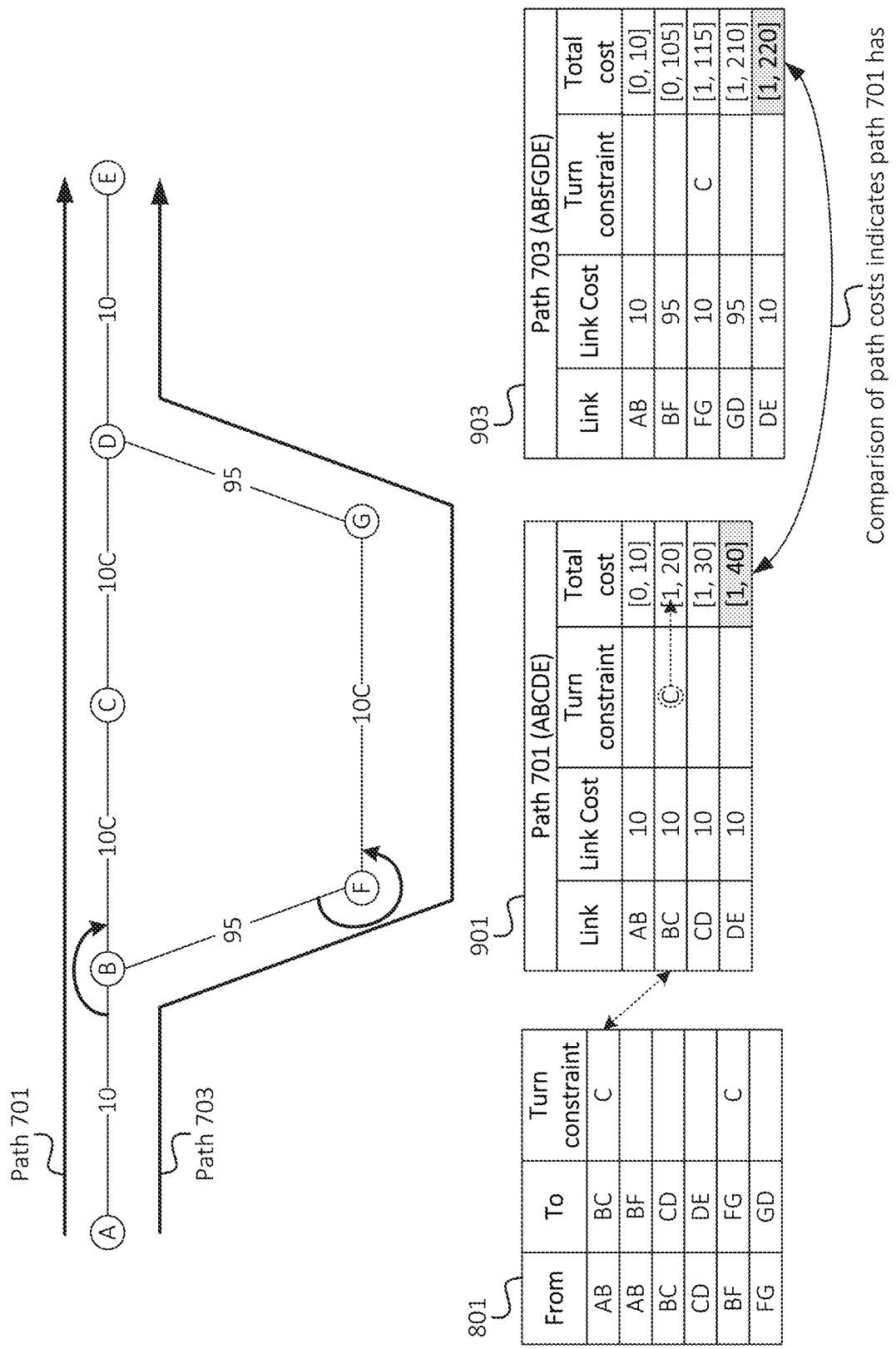
FIG. 9 illustrates an example of determining costs associated with particular paths based on turns into constraint regions, in accordance with some embodiments.

The turn constraint costs may be used to more accurately reflect the actual costs of paths that traverse constraint regions. For example, as shown in FIG. 9, data structure 901 may reflect a cost of path 701 (e.g., Path(ABCDE)), using the turn constraint costs discussed above. Since path 701 includes only one turn constraint (e.g., the constraint when entering Link(BC) from Link(AB)), the total cost of path 701 may be [1, 40], where the "1" represents the single instance of the constraint on path 701. Using a similar cost determination technique, as reflected in data structure 903, the cost for path 703 may be [1, 220]. Thus, in this example, path 701 may be a more optimal, better, otherwise less costly path than path 701. That is, although both paths violate the same constraint, path 701 may otherwise have a lower cost than path 703 (i.e., 40 as opposed to 220). As such, although neither path avoids the constraint, path 701 may still be relatively better than path 703.

It may be noted that the result determined in the example of FIG. 9 is therefore different than the result determined in the example of FIG. 7. That is, in FIG. 7, the quantity of links with the same constraint are counted and included in the total costs for paths 701 and 703 (i.e., [2, 40] and [1, 220], respectively), while in FIG. 9 the quantity of turn constraints and/or constraint regions are counted and included in the total costs for paths 701 and 703 (i.e., [1, 40] and [1, 220], respectively). As such, the technique shown in FIG. 9 may yield a more intuitive or appropriate result, that does not count multiple contiguous links with the same constraint.

Figure 10:
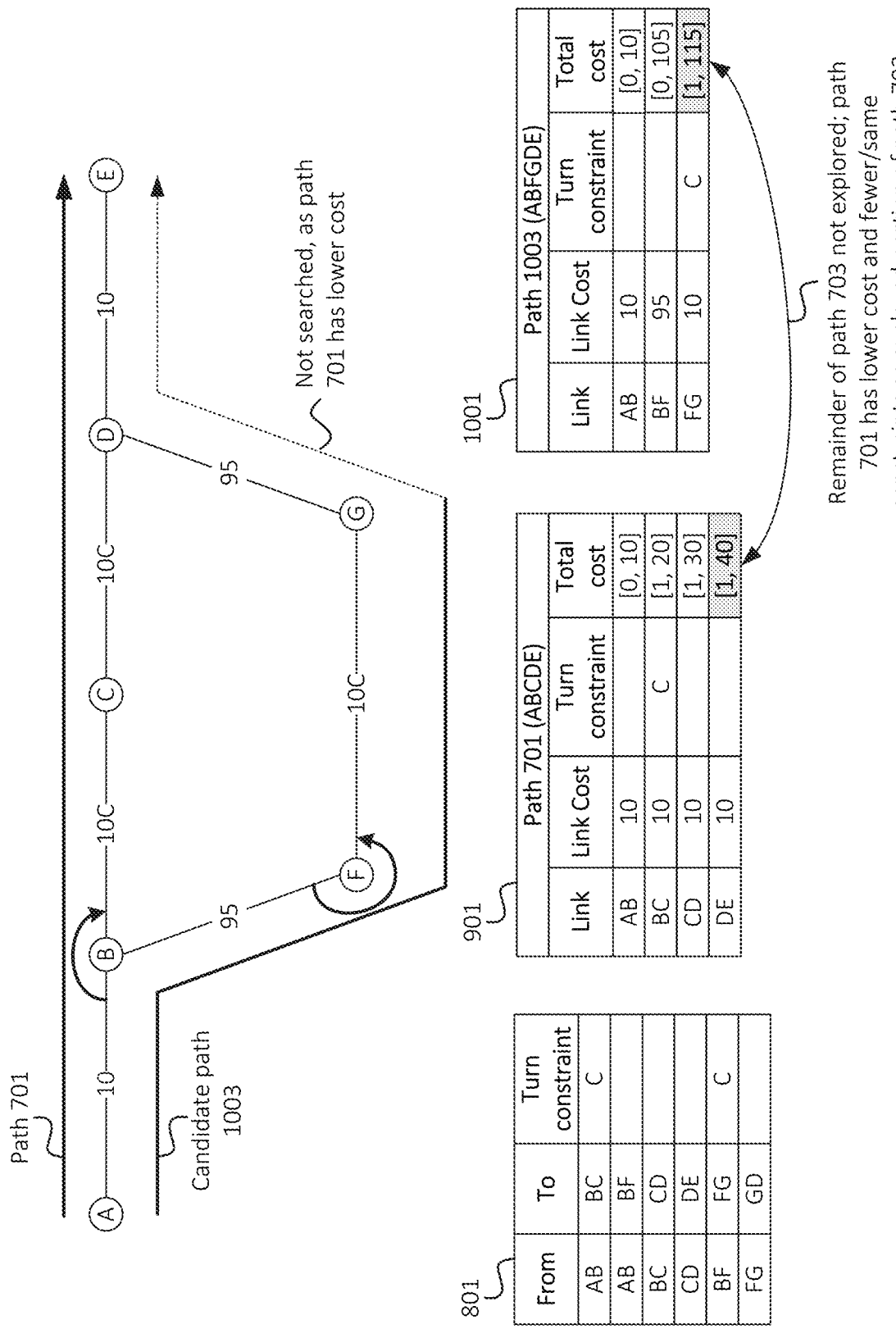
FIG. 10 illustrates an example of pruning a search by ceasing to explore nodes from a path that is more restrictive than another candidate path, in accordance with some embodiments.

Further, as shown in FIG. 10, turn constraints may be used to reduce an amount of processing time and/or resources in techniques that determine routes via exploration or other identification of potential links or routes between nodes (e.g., a Dijkstra search or other type of technique). In some embodiments, such techniques may include prioritize the exploration of lower cost links or routes, and may forgo exploring higher cost links or routes when a solution (e.g., a path from a starting node to an ending node) is found. In some embodiments, such techniques may be employed during a witness search, as similarly described above. In some embodiments, such techniques may employed when identifying a route from a starting point to a destination, such as in response to a navigation query. In some embodiments, such techniques may be employed during some other procedure in which routes, with associated costs, from a starting point or source node to a destination or target node are determined.

For example, data structures 901 and 1001 may indicate explorations or traversals that occur when searching for paths from Node A to Node E, including path 701 and candidate path 1003. In some embodiments, paths 701 and 1003 may be determined concurrently, may be determined using a Djikstra search, and/or may otherwise be determined in some other dependent manner. For example, paths 701 and 1003 may be iteratively explored based on relative costs of each path, where the exploration prioritizes or favors lower cost and/or less restrictive paths before exploring higher cost and/or more restrictive paths.

In this example, from Node A, Node B may be reached and then Link(BC) and Link(BF) may be explored from Node B. As the turn from Link(AB) to Link(BC) may be associated with a turn constraint, the exploration may continue with evaluating links starting with Node F (e.g., since turning on to Link(BC) would violate a constraint while turning on to Link(BF) would not violate the constraint). Here, turning on to Link(FG) from Link(BF) also violates a constraint. At this stage in the search, Path(ABC) (e.g., an explored portion of path 701) may be associated with a cost of [1, 20] while Path(ABF) (e.g., an explored portion of path 1003) may be associated with a cost of [1, 115]. Thus, the search may continue from Node C (e.g., after traversing Path(ABC)). Eventually, the search may result in identifying path 701, with a cost of [1, 40]. Since path 701 reaches the destination (e.g., Node E) and the explored portion of path 1003 has a higher cost of [1, 115], the search may forgo continue exploring candidate path 1003, as it would not be possible for path 1003 to have a lower cost than path 701, even if path 1003 would hypothetically provide a path from Node A to Node E. In this manner, the search may be pruned to avoid searching routes that, due to the turn constraints and associated costs described herein, would not provide optimal routes compared to other routes.

Figure 11:
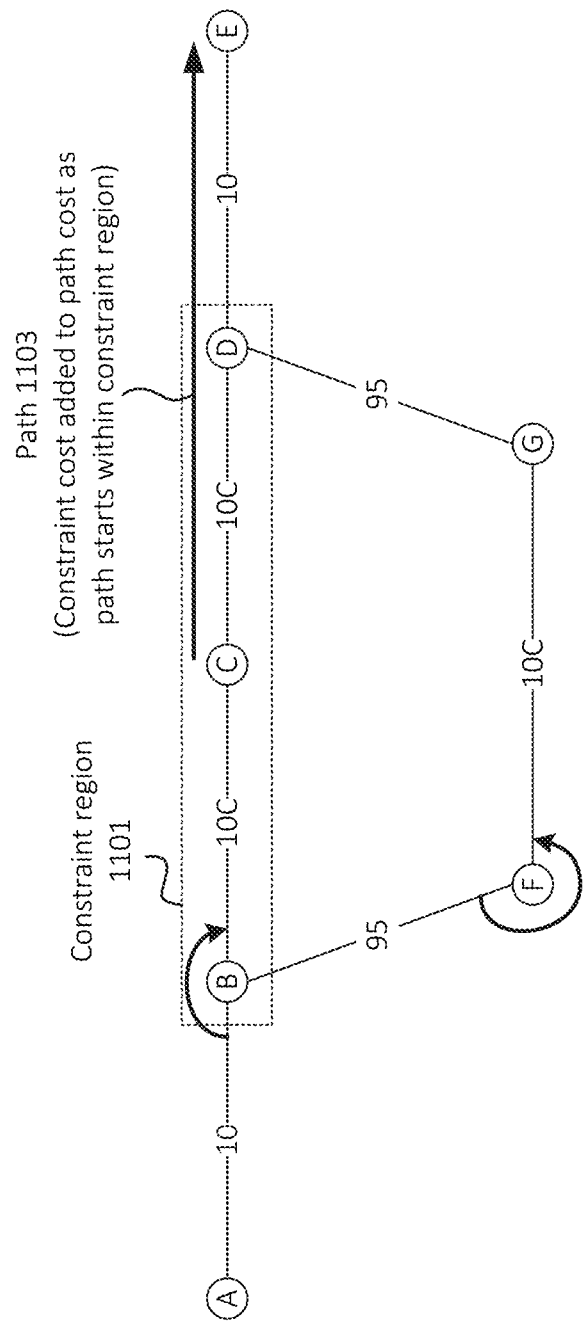
FIG. 11 illustrates an example of determining a cost of a path that starts within a constraint region, in accordance with some embodiments.

As noted above, contiguous links with the same constraint may be considered as constraint regions. FIG. 11 shows example constraint region 1101, which includes Nodes B, C, and D. In some embodiments, when a path starts within a constraint region, the cost to enter the constraint region is added to the cost of the path, even though a turn with a constraint cost was not traversed. For example, while path 1103 does not include the constrained turn from Link(AB) to Link(BC), on which constraint region 1101 is based, path 1103 may be associated with the cost of entering constraint region 1101. Counting the cost to enter constraint region 1101, without counting individual constrained links, may properly account for the constraint associated with constraint region 1101.

Figure 12:
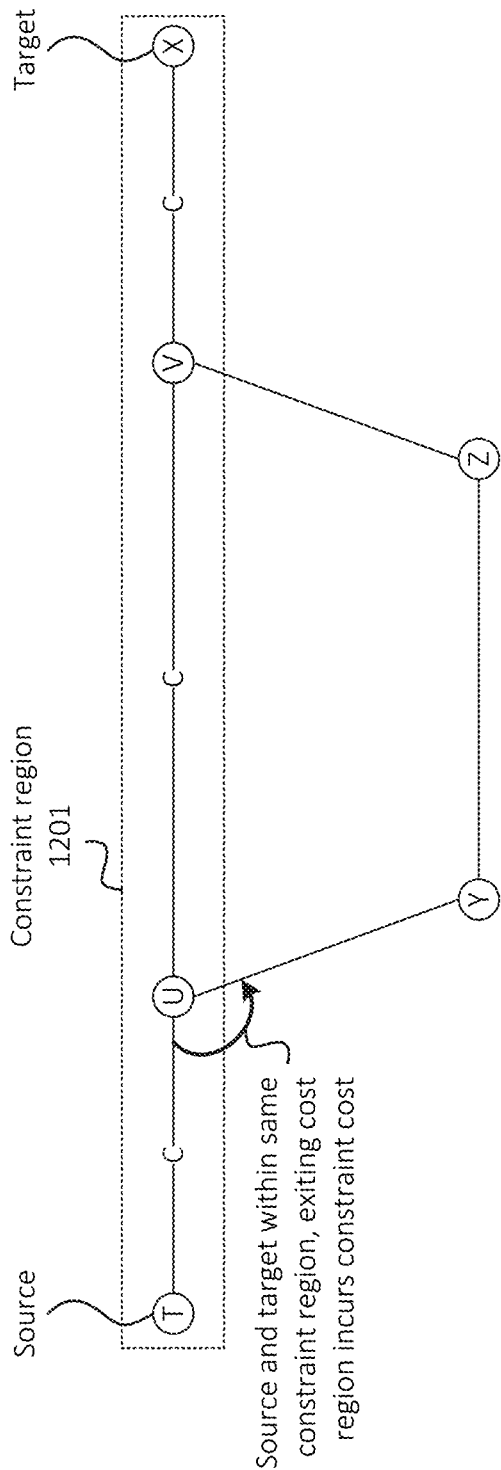
FIGS. 12-14 illustrate an example of determining costs of paths for a source node and a target node that are both within a constraint region, in accordance with some embodiments.

In situations where a source node and a target node for a search are located within the same constraint region, such as constraint region 1201 in FIG. 12, some embodiments may assess the constraint cost for paths that exit constraint region 1201. That is, since the target node (e.g., Node X in FIG. 12) is within the same constraint region 1201 as the source node (e.g., Node T), leaving constraint region 1201 at some point would necessarily mean re-entering the same constraint region 1201 in order to reach the target node.

Figure 13:
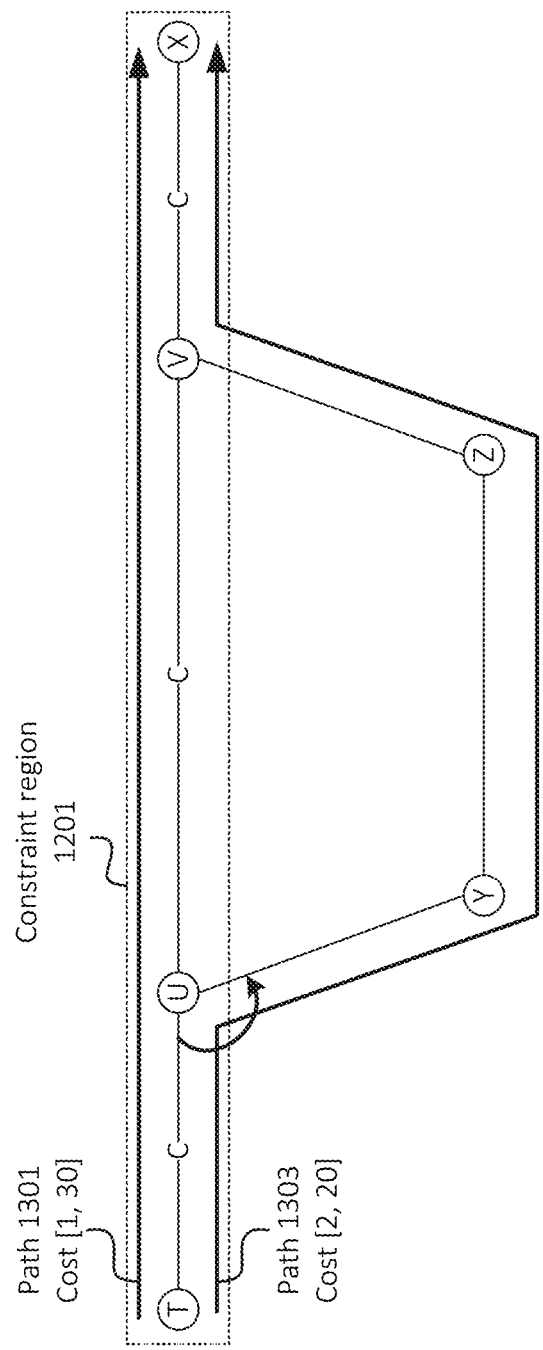

For example, example path 1301, shown in FIG. 13, does not leave constraint region 1201. As such, the cost associated with path 1301 may be [1, 30], where "1" represents the cost associated with starting inside constraint region 1201 (e.g., as discussed above with respect to FIG. 11), and "30" represents the cost associated with traversing Path(TUVX) notwithstanding the constraints. On the other hand, path 1303 may have a cost of [2, 20], where "2" represents the cost associated with starting inside constraint region 1201 as well as entering (e.g., re-entering) constraint region 1201 when turning from Link(ZV) to Link(VX). In some embodiments, the cost of re-entering constraint region 1201 may be incurred or annotated with respect to path 1303 when path 1303 exits constraint region 1201 when turning from Link (TU) to Link(UY). Thus, in this example, path 1301 may be selected as a more optimal or lower cost path, as path 1301 includes fewer constraint violations than path 1303.

Figure 14:
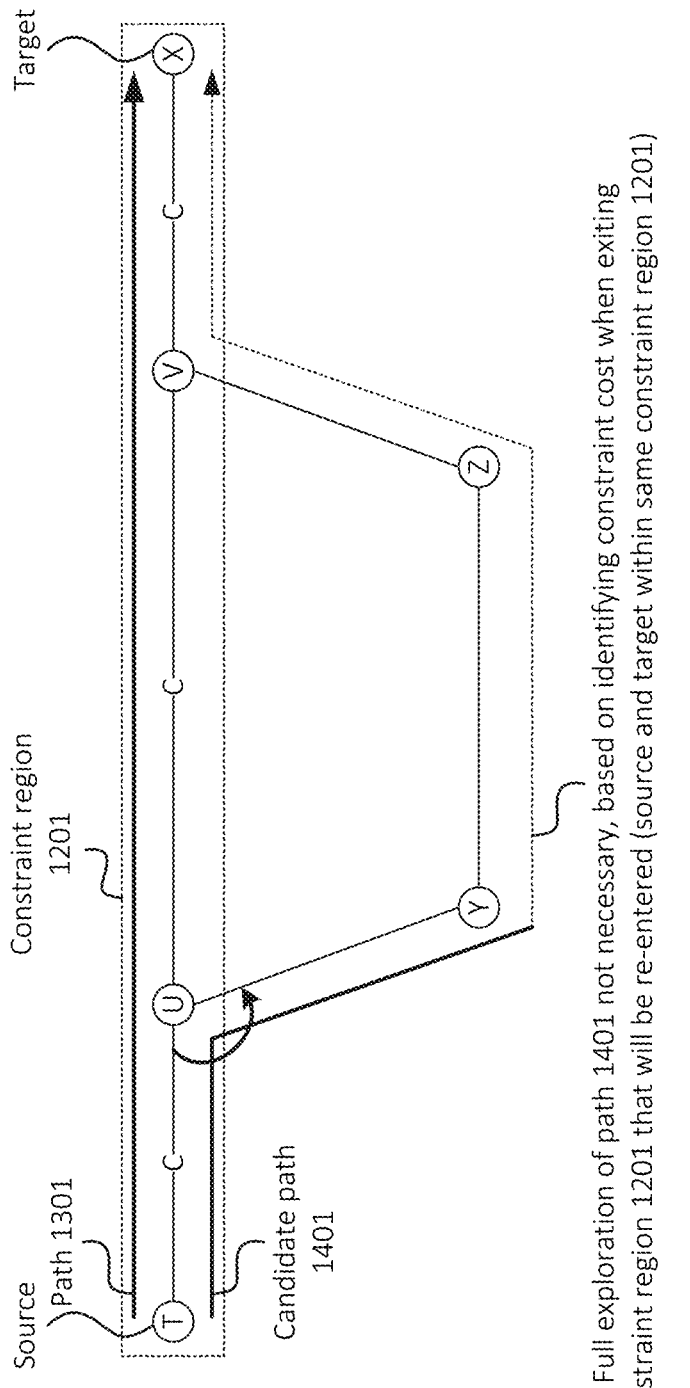

In some embodiments, assessing the constraint cost when constraint region 1201 is exited, and when the source and target are within constraint region 1201, may allow for search techniques to avoid exploring paths or portions of paths, thus saving time and/or processing resources in performing such searches. For example, as shown in FIG. 14, the exploration of candidate path 1401 may cease once the constraint cost associated with the turn from Link(TU) to Link(UY) is incurred. For example, once this constraint cost is incurred, the search techniques may continue exploring or traversing path 1301, and may ultimately determine that path 1301 is necessarily a lower path than path 1401 could be, even if path 1401 would hypothetically eventually include a path from Node T to Node X. For example, once Link(UY) is explored, candidate path 1401 may be associated with two constraint violations (e.g., as assessed based on starting within and then exiting constraint region 1201), while path 1301 may be associated with only one constraint violation.

Figure 15:
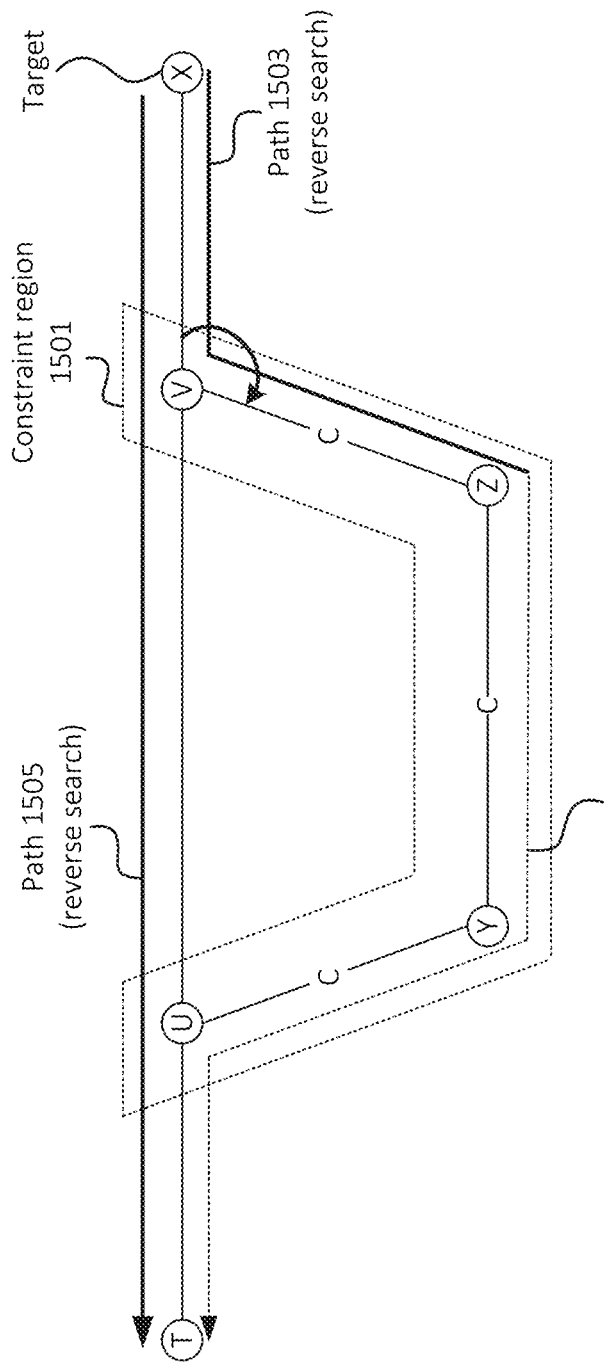
FIG. 15 illustrates an example of determining costs of paths associated with a reverse search for a source node and a target node that are both not within a constraint region, in accordance with some embodiments.

In some embodiments, exits from a constraint region may be associated with a constraint cost in some situations, such as a reverse search associated with a source node and a target node that are both outside of a constraint region. The reverse search may be part of a bidirectional search, in which a forward search is performed from the source node and a reverse search is performed from the target node, and a path from source node to the target node is identified based on an intersection of the forward search and the reverse search. FIG. 15 illustrates an example in which a reverse search is performed from Node X to some other node (e.g., towards Node T or towards some other node that is not shown in the figure).

In the example of FIG. 15, constraint region 1501 may include Link(UY), Link(YZ), and Link(ZV). Assume, for this example, that the source node (e.g., the node towards which the reverse search is directed, such as Node T or some other node) is outside of constraint region 1501. Since the source and target nodes are both outside of constraint region 1501, some embodiments may assess the constraint cost associated with constraint region 1501 when a path of the reverse search enters constraint region 1501. The reverse search entering constraint region 1501 may represent a forward path, from the source node to the target node, exiting constraint region 1501. Exiting a constraint region would not normally incur the constraint cost, as such a transition would represent a path going from a more restrictive link to a less restrictive link. However, since the source and target nodes are both outside of constraint region 1501, a reverse path that enters constraint region 1501 indicates that a forward path that would intersect with the reverse path would need to enter constraint region 1501, thereby indicating that the cost associated with constraint region 1501 would at some point be incurred by a forward path that meets the reverse path. As such, some embodiments may assess the cost associated constraint region 1501 when the reverse path enters constraint region 1501, even though such an event would, by itself, simply indicate a transition from a more restrictive node to a less restrictive node.

Assessing the cost in this manner may serve to prune the reverse search, thus eliminating the need to explore additional nodes, thereby consuming fewer processing resources and/or time for the reverse search. For example, path 1503 enters constraint region 1501 when turning from backwards Link(XV) to backwards Link(VZ). As discussed above, since the target node (i.e., Node(X) in this example) and the source node (e.g., Node(T) and/or some other node) are not within constraint region 1501, the entering of constraint region 1501 by reverse path 1503 may incur the cost associated with constraint region 1501 (e.g., denoting that a forward path would, at some point, enter constraint region 1501). As such, the reverse search may cease exploring reverse path 1503 once the constraint cost for turning onto reverse Link(VZ) is identified. For example, the reverse search may identify a lower cost path, such as reverse path 1505. Here, reverse path 1505 may not be associated with the constraint, as reverse path 1505 does not enter constraint region 1501 (e.g., Link(UV) and/or reverse Link(VU) are not within constraint region 1501).

Figure 16:
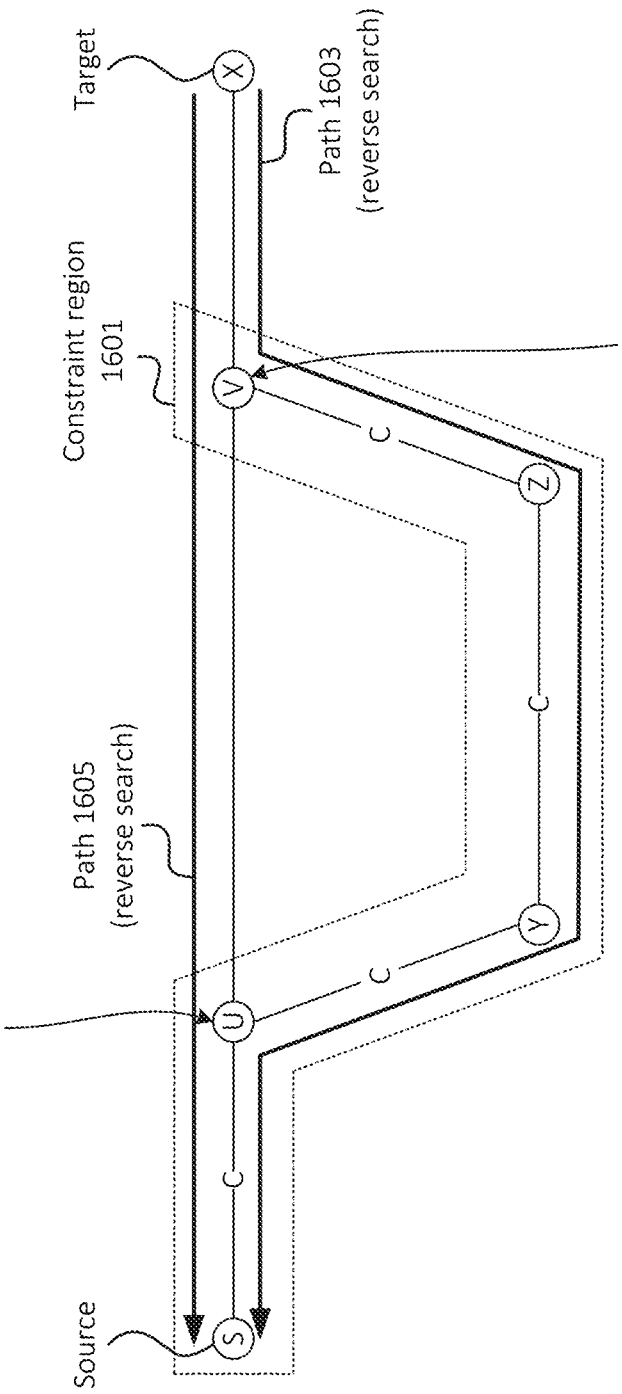
FIG. 16 illustrates an example of determining costs of paths associated with a reverse search for a target node that is not within a constraint region and a source node that is within the constraint region, in accordance with some embodiments.

On the other hand, in situations where the source node is inside a constraint region and the target node is outside of the constraint region, the reverse search entering the constraint region may not incur the cost associated with the constraint region. That is, since the target node is outside of the constraint region, the reverse path entering the constraint region represents the forward path turning from a more restrictive link to a less restrictive link, which does not incur a constraint cost. For example, as shown in FIG. 16, constraint region 1601 may include Link(SU), Link(UY), Link (YZ), and Link(ZV). In other words, the first link of the forward search (i.e., Link(SU) in this example) is within constraint region 1601. Since the first link of the forward search is within constraint region 1601, a constraint cost may not be assessed to reverse path 1603 when reverse path 1603 enters constraint region 1601 by turning onto reverse Link(VZ). For example, this turn may represent the forward search exiting constraint region 1601 and, since the forward search starts in constraint region 1601, the entering of constraint region 1601 by reverse path 1603 does not imply any additional constraint cost. Under the same rationale, no constraint cost may be assessed to reverse path 1605 when reverse path 1605 enters constraint region 1601 by turning from reverse Link(VU) to reverse Link(US).

Figure 17:
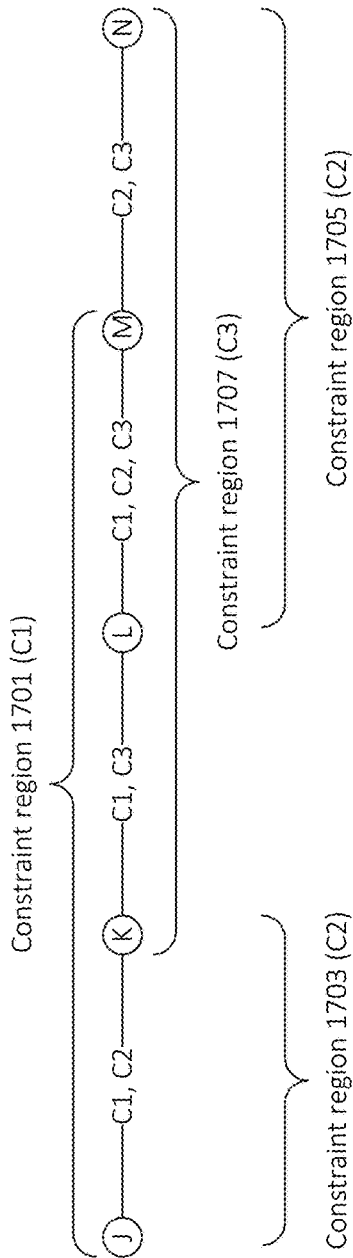
FIG. 17 illustrates an example of multiple constraint regions that may be associated with multiple different types of constraints, in accordance with some embodiments.

While examples above are described in the context of one type of constraint (denoted as "C"), such as a vehicle height restriction, weight limit, etc., similar concepts may apply to multiple types of constraints. In some embodiments, for example, a particular link may be associated with multiple constraints, and/or different links may be associated with different constraints. As shown in FIG. 17, for example, Link(JK) may be associated with a first constraint C1 and a second constraint C2, such as a height limit and a weight limit. Further, Link(KL) may be associated with the first constraint C1 and a third constraint C3; Link(LM) may be associated with constraints C1, C2, and C3; and Link(MN) may be associated with constraints C2 and C3. Thus, constraint region 1701, which is associated with constraint C1, may include the contiguous sequence of links: Link(JK), Link(KL), and Link(LM). Constraint region 1703, which is associated with constraint C2, may include the single Link (JK). Constraint region 1705, which is also associated with constraint C2, may include the contiguous sequence of links: Link(LM) and Link(MN). Further, constraint region 1707, which is associated with constraint C3, may include the contiguous sequence of links: Link(KL), Link(LM), and Link(MN).

In some embodiments, the costs associated with each different constraint or type of constraint may be different. In some embodiments, the types of constraints may be ranked, prioritized, etc. differently. For example, constraint C1 may be a "soft" constraint such as a gravel road which may be undesirable to drive on, while constraint C2 may be a "hard" constraint such as a height limit that cannot be physically broken. For example, a first path that includes constraint C1 may be considered as having a higher constraint cost than a second path that does not include any constraints, but may be considered as having a lower constraint cost than a third path that includes constraint C2. The hierarchical or ranked nature of different constraints may thus be used in a similar manner discussed above, in order to reduce a search space and/or to prune a search that uses exploration techniques or other suitable techniques.

Figure 18:
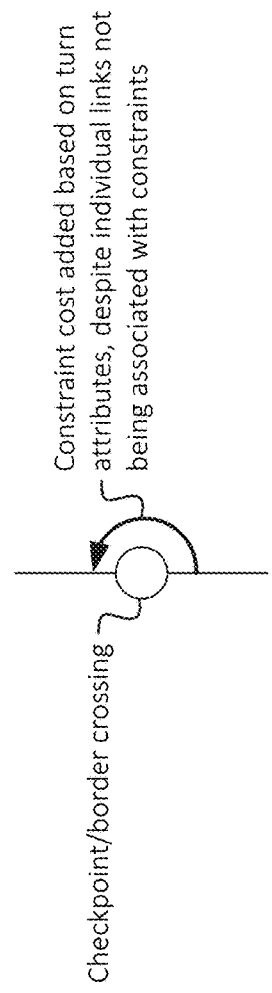
FIG. 18 illustrates an example of adding a constraint cost to turns between links that may not individually be associated with the constraint cost, in accordance with some embodiments.

In some embodiments, constraints may be manually or automatically added to turns in a node map, without the constraints being associated with particular links. For example, as shown in FIG. 18, a constraint cost may be added to a turn that represents a border crossing, which may reflect that making this turn (e.g., traversing from one link to the other) is relatively costly in time (e.g., may be subject to a lengthy queue or checkpoint) or is impossible (e.g., in situations where crossing the border may be impermissible due to applicable laws or other factors). In some embodiments, such turn constraints may be added to other types of intersections between different types of links in addition to, or in lieu of, border crossings.

Figure 19:
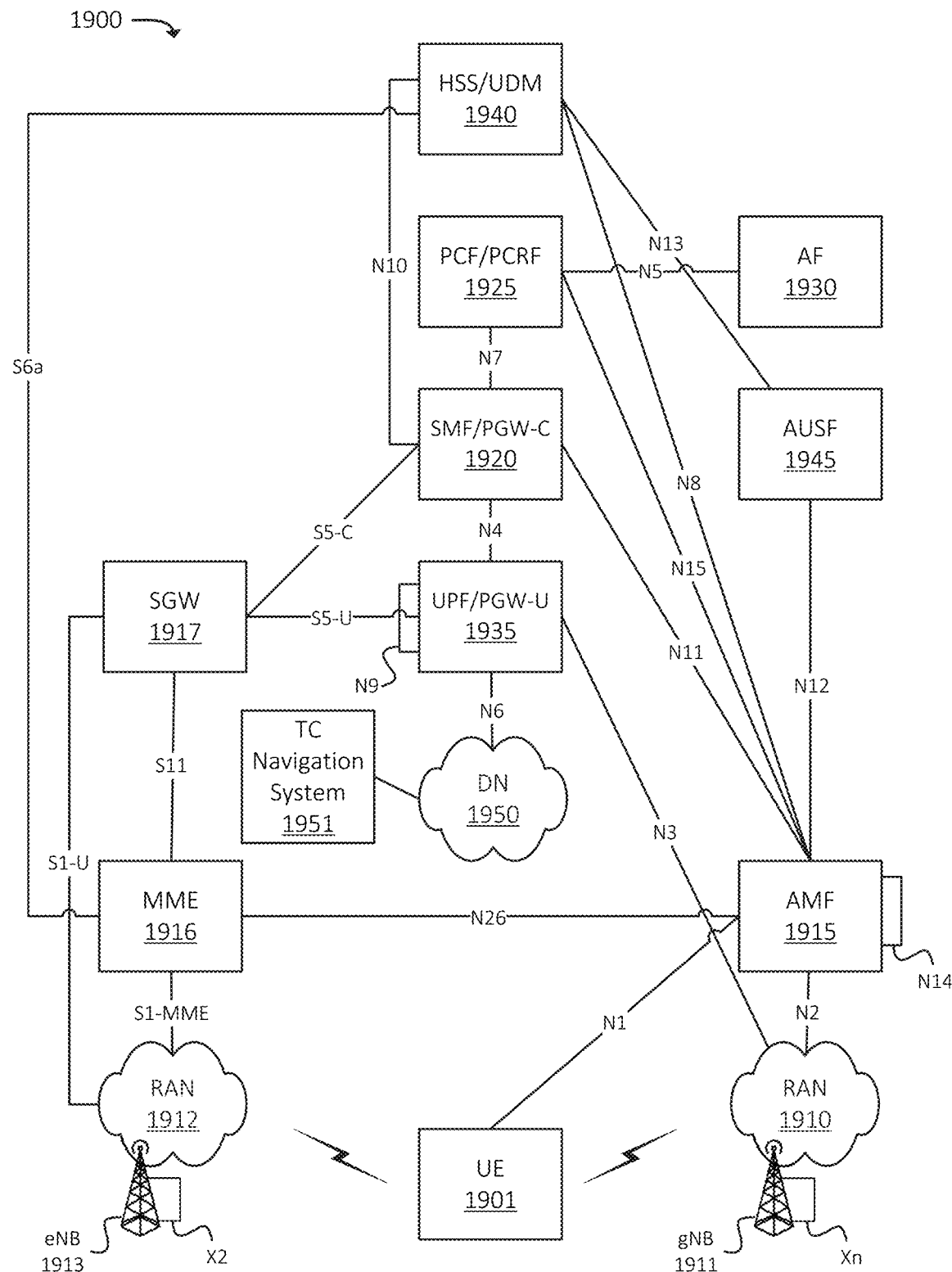
FIG. 19 illustrates an example environment in which one or more embodiments, described herein, may be implemented.

FIG. 19 illustrates an example environment 1900, in which one or more embodiments may be implemented. In some embodiments, environment 1900 may correspond to a Fifth Generation ("5G") network, and/or may include elements of a 5G network. In some embodiments, environment 1900 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1900 may include UE 1901, RAN 1910 (which may include one or more Next Generation Node Bs ("gNBs") 1911), RAN 1912 (which may include one or more evolved Node Bs ("eNBs") 1913), and various network functions such as Access and Mobility Management Function ("AMF") 1915, Mobility Management Entity ("MME") 1916, Serving Gateway ("SGW") 1917, Session Management Function ("SMF")/Packet Data Network ("PDN") Gateway ("PGW")-Control plane function ("PGW-C") 1920, Policy Control Function ("PCF")/Policy Charging and Rules Function ("PCRF") 1925, Application Function ("AF") 1930, User Plane Function ("UPF")/PGW-User plane function ("PGW-U") 1935, Home Subscriber Server ("HSS")/Unified Data Management ("UDM") 1940, and Authentication Server Function ("AUSF") 1945. Environment 1900 may also include one or more networks, such as Data Network ("DN") 1950. Environment 1900 may include one or more additional devices or systems communicatively coupled to one or more networks (e.g., DN 1950), such as Turn Constraint Navigation System ("TCNS") 1951, which may perform some or all of the operations described above.

The example shown in FIG. 19 illustrates one instance of each network component or function (e.g., one instance of SMF/PGW-C 1920, PCF/PCRF 1925, UPF/PGW-U 1935, HSS/UDM 1940, and/or AUSF 1945). In practice, environment 1900 may include multiple instances of such components or functions. For example, in some embodiments, environment 1900 may include multiple "slices" of a core network, where each slice includes a discrete set of network functions (e.g., one slice may include a first instance of SMF/PGW-C 1920, PCF/PCRF 1925, UPF/PGW-U 1935, HSS/UDM 1940, and/or AUSF 1945, while another slice may include a second instance of SMF/PGW-C 1920, PCF/PCRF 1925, UPF/PGW-U 1935, HSS/UDM 1940, and/or AUSF 1945). The different slices may provide differentiated levels of service, such as service in accordance with different Quality of Service ("QoS") parameters.

The quantity of devices and/or networks, illustrated in FIG. 19, is provided for explanatory purposes only. In practice, environment 1900 may include additional devices and/or networks, fewer devices and/or networks, different devices and/or networks, or differently arranged devices and/or networks than illustrated in FIG. 19. For example, while not shown, environment 1900 may include devices that facilitate or enable communication between various components shown in environment 1900, such as routers, modems, gateways, switches, hubs, etc. Alternatively, or additionally, one or more of the devices of environment 1900 may perform one or more network functions described as being performed by another one or more of the devices of environment 1900. Devices of environment 1900 may interconnect with each other and/or other devices via wired connections, wireless connections, or a combination of wired and wireless connections. In some implementations, one or more devices of environment 1900 may be physically integrated in, and/or may be physically attached to, one or more other devices of environment 1900.

UE 1901 may include a computation and communication device, such as a wireless mobile communication device that is capable of communicating with RAN 1910, RAN 1912, and/or DN 1950. UE 1901 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 1901 may send traffic to and/or receive traffic (e.g., user plane traffic) from DN 1950 via RAN 1910, RAN 1912, and/or UPF/PGW-U 1935.

RAN 1910 may be, or may include, a 5G RAN that includes one or more base stations (e.g., one or more gNBs 1911), via which UE 1901 may communicate with one or more other elements of environment 1900. UE 1901 may communicate with RAN 1910 via an air interface (e.g., as provided by gNB 1911). For instance, RAN 1910 may receive traffic (e.g., voice call traffic, data traffic, messaging traffic, signaling traffic, etc.) from UE 1901 via the air interface, and may communicate the traffic to UPF/PGW-U 1935, and/or one or more other devices or networks. Similarly, RAN 1910 may receive traffic intended for UE 1901 (e.g., from UPF/PGW-U 1935, AMF 1915, and/or one or more other devices or networks) and may communicate the traffic to UE 1901 via the air interface.

RAN 1912 may be, or may include, a LTE RAN that includes one or more base stations (e.g., one or more eNBs 1913), via which UE 1901 may communicate with one or more other elements of environment 1900. UE 1901 may communicate with RAN 1912 via an air interface (e.g., as provided by eNB 1913). For instance, RAN 1910 may receive traffic (e.g., voice call traffic, data traffic, messaging traffic, signaling traffic, etc.) from UE 1901 via the air interface, and may communicate the traffic to UPF/PGW-U 1935, and/or one or more other devices or networks. Similarly, RAN 1910 may receive traffic intended for UE 1901 (e.g., from UPF/PGW-U 1935, SGW 1917, and/or one or more other devices or networks) and may communicate the traffic to UE 1901 via the air interface.

AMF 1915 may include one or more devices, systems, Virtualized Network Functions ("VNFs"), Cloud-Native Network Functions ("CNFs"), etc., that perform operations to register UE 1901 with the 5G network, to establish bearer channels associated with a session with UE 1901, to hand off UE 1901 from the 5G network to another network, to hand off UE 1901 from the other network to the 5G network, manage mobility of UE 1901 between RANs 1910 and/or gNBs 1911, and/or to perform other operations. In some embodiments, the 5G network may include multiple AMFs 1915, which communicate with each other via the N14 interface (denoted in FIG. 19 by the line marked "N14" originating and terminating at AMF 1915).

MME 1916 may include one or more devices, systems, VNFs, CNFs, etc., that perform operations to register UE 1901 with the EPC, to establish bearer channels associated with a session with UE 1901, to hand off UE 1901 from the EPC to another network, to hand off UE 1901 from another network to the EPC, manage mobility of UE 1901 between RANs 1912 and/or eNBs 1913, and/or to perform other operations.

SGW 1917 may include one or more devices, systems, VNFs, CNFs, etc., that aggregate traffic received from one or more eNBs 1913 and send the aggregated traffic to an external network or device via UPF/PGW-U 1935. Additionally, S G W 1917 may aggregate traffic received from one or more UPF/PGW-Us 1935 and may send the aggregated traffic to one or more eNBs 1913. SGW 1917 may operate as an anchor for the user plane during inter-eNB handovers and as an anchor for mobility between different telecommunication networks or RANs (e.g., RANs 1910 and 1912).

SMF/PGW-C 1920 may include one or more devices, systems, VNFs, CNFs, etc., that gather, process, store, and/or provide information in a manner described herein. SMF/PGW-C 1920 may, for example, facilitate the establishment of communication sessions on behalf of UE 1901. In some embodiments, the establishment of communications sessions may be performed in accordance with one or more policies provided by PCF/PCRF 1925.

PCF/PCRF 1925 may include one or more devices, systems, VNFs, CNFs, etc., that aggregate information to and from the 5G network and/or other sources. PCF/PCRF 1925 may receive information regarding policies and/or subscriptions from one or more sources, such as subscriber databases and/or from one or more users (such as, for example, an administrator associated with PCF/PCRF 1925).

AF 1930 may include one or more devices, systems, VNFs, CNFs, etc., that receive, store, and/or provide information that may be used in determining parameters (e.g., quality of service parameters, charging parameters, or the like) for certain applications.

UPF/PGW-U 1935 may include one or more devices, systems, VNFs, CNFs, etc., that receive, store, and/or provide data (e.g., user plane data). For example, UPF/PGW-U 1935 may receive user plane data (e.g., voice call traffic, data traffic, etc.), destined for UE 1901, from DN 1950, and may forward the user plane data toward UE 1901 (e.g., via RAN 1910, SMF/PGW-C 1920, and/or one or more other devices). In some embodiments, multiple UPFs 1935 may be deployed (e.g., in different geographical locations), and the delivery of content to UE 1901 may be coordinated via the N9 interface (e.g., as denoted in FIG. 19 by the line marked "N9" originating and terminating at UPF/PGW-U 1935). Similarly, UPF/PGW-U 1935 may receive traffic from UE 1901 (e.g., via RAN 1910, SMF/PGW-C 1920, and/or one or more other devices), and may forward the traffic toward DN 1950. In some embodiments, UPF/PGW-U 1935 may communicate (e.g., via the N4 interface) with SMF/PGW-C 1920, regarding user plane data processed by UPF/PGW-U 1935.

HSS/UDM 1940 and AUSF 1945 may include one or more devices, systems, VNFs, CNFs, etc., that manage, update, and/or store, in one or more memory devices associated with AUSF 1945 and/or HSS/UDM 1940, profile information associated with a subscriber. AUSF 1945 and/or HSS/UDM 1940 may perform authentication, authorization, and/or accounting operations associated with the subscriber and/or a communication session with UE 1901.

DN 1950 may include one or more wired and/or wireless networks. For example, DN 1950 may include an Internet Protocol ("IP")-based PDN, a wide area network ("WAN") such as the Internet, a private enterprise network, and/or one or more other networks. UE 1901 may communicate, through DN 1950, with data servers, other UEs 1901, and/or to other servers or applications that are coupled to DN 1950. DN 1950 may be connected to one or more other networks, such as a public switched telephone network ("PSTN"), a public land mobile network ("PLMN"), and/or another network. DN 1950 may be connected to one or more devices, such as content providers, applications, web servers, and/or other devices, with which UE 1901 may communicate.

Figure 20:
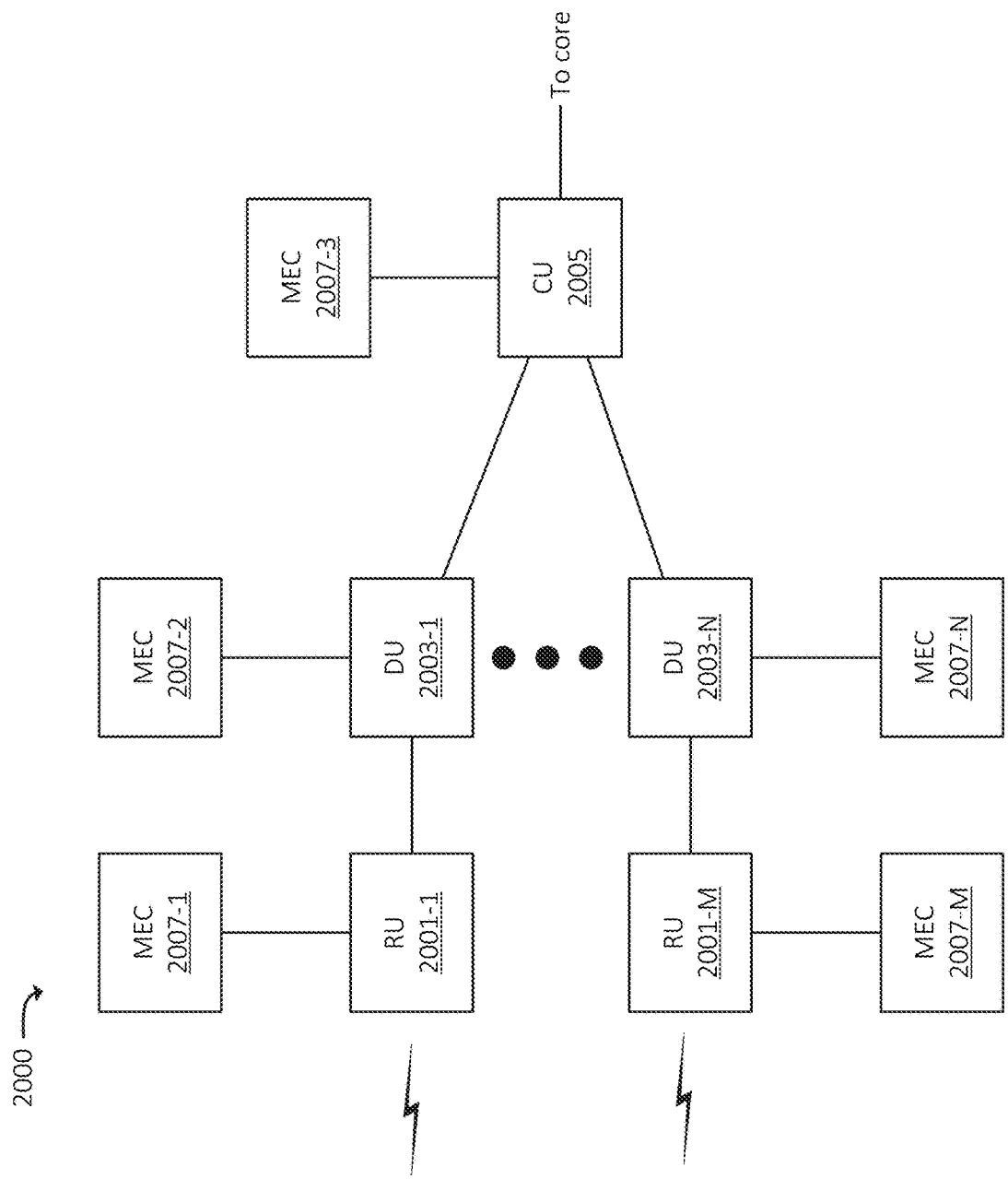
FIG. 20 illustrates an example arrangement of a radio access network ("RAN"), in accordance with some embodiments.

FIG. 20 illustrates an example Distributed Unit ("DU") network 2000, which may be included in and/or implemented by one or more RANs (e.g., RAN 1910, RAN 1912, or some other RAN). In some embodiments, a particular RAN may include one DU network 2000. In some embodiments, a particular RAN may include multiple DU networks 2000. In some embodiments, DU network 2000 may correspond to a particular gNB 1911 of a 5G RAN (e.g., RAN 1910). In some embodiments, DU network 2000 may correspond to multiple gNBs 1911. In some embodiments, DU network 2000 may correspond to one or more other types of base stations of one or more other types of RANs. As shown, DU network 2000 may include Central Unit ("CU") 2005, one or more Distributed Units ("DUs") 2003-1 through 2003-N (referred to individually as "DU 2003," or collectively as "DUs 2003"), and one or more Radio Units ("RUs") 2001-1 through 2001-M (referred to individually as "RU 2001," or collectively as "RUs 2001").

CU 2005 may communicate with a core of a wireless network (e.g., may communicate with one or more of the devices or systems described above with respect to FIG. 19, such as AMF 1915 and/or UPF/PGW-U 1935). In the uplink direction (e.g., for traffic from UEs 1901 to a core network), CU 2005 may aggregate traffic from DUs 2003, and forward the aggregated traffic to the core network. In some embodiments, CU 2005 may receive traffic according to a given protocol (e.g., Radio Link Control ("RLC")) from DUs 2003, and may perform higher-layer processing (e.g., may aggregate/process RLC packets and generate Packet Data Convergence Protocol ("PDCP") packets based on the RLC packets) on the traffic received from DUs 2003.

In accordance with some embodiments, CU 2005 may receive downlink traffic (e.g., traffic from the core network) for a particular UE 1901, and may determine which DU(s) 2003 should receive the downlink traffic. DU 2003 may include one or more devices that transmit traffic between a core network (e.g., via CU 2005) and UE 1901 (e.g., via a respective RU 2001). DU 2003 may, for example, receive traffic from RU 2001 at a first layer (e.g., physical ("PHY") layer traffic, or lower PHY layer traffic), and may process/aggregate the traffic to a second layer (e.g., upper PHY and/or RLC). DU 2003 may receive traffic from CU 2005 at the second layer, may process the traffic to the first layer, and provide the processed traffic to a respective RU 2001 for transmission to UE 1901.

RU 2001 may include hardware circuitry (e.g., one or more RF transceivers, antennas, radios, and/or other suitable hardware) to communicate wirelessly (e.g., via an RF interface) with one or more UEs 1901, one or more other DUs 2003 (e.g., via RUs 2001 associated with DUs 2003), and/or any other suitable type of device. In the uplink direction, RU 2001 may receive traffic from UE 1901 and/or another DU 2003 via the RF interface and may provide the traffic to DU 2003. In the downlink direction, RU 2001 may receive traffic from DU 2003, and may provide the traffic to UE 1901 and/or another DU 2003.

RUs 2001 may, in some embodiments, be communicatively coupled to one or more Multi-Access/Mobile Edge Computing ("MEC") devices, referred to sometimes herein simply as "MECs" 2007. For example, RU 2001-1 may be communicatively coupled to MEC 2007-1, RU 2001-M may be communicatively coupled to MEC 2007-M, DU 2003-1 may be communicatively coupled to MEC 2007-2, DU 2003-N may be communicatively coupled to MEC 2007-N, CU 2005 may be communicatively coupled to MEC 2007-3, and so on. MECs 2007 may include hardware resources (e.g., configurable or provisionable hardware resources) that may be configured to provide services and/or otherwise process traffic to and/or from UE 1901, via a respective RU 2001.

For example, RU 2001-1 may route some traffic, from UE 1901, to MEC 2007-1 instead of to a core network (e.g., via DU 2003 and CU 2005). MEC 2007-1 may process the traffic, perform one or more computations based on the received traffic, and may provide traffic to UE 1901 via RU 2001-1. In this manner, ultra-low latency services may be provided to UE 1901, as traffic does not need to traverse DU 2003, CU 2005, and an intervening backhaul network between DU network 2000 and the core network. In some embodiments, MEC 2007 may include, and/or may implement, some or all of the functionality described above with respect to TCNS 1951, UPF 1935, and/or one or more other devices, systems, VNFs, CNFs, etc.

Figure 21:
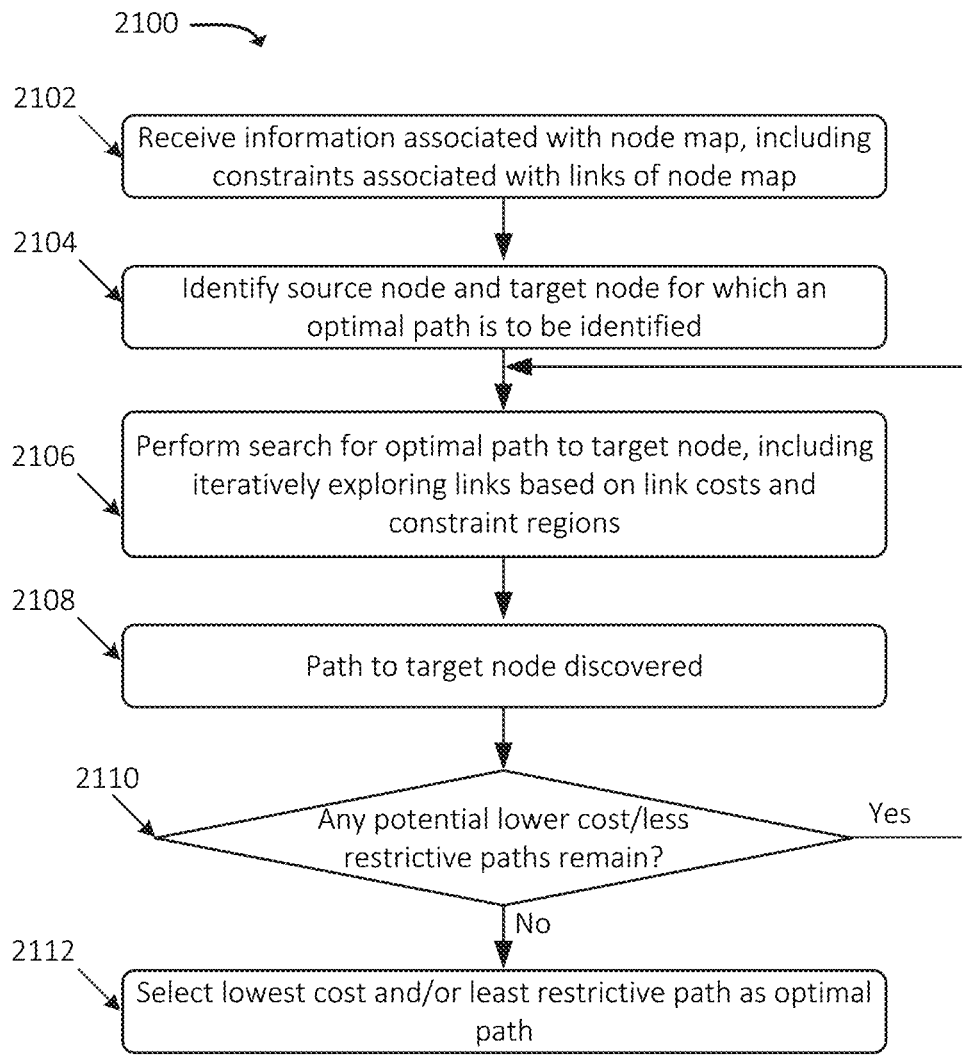
FIG. 21 illustrates an example process for determining an optimal path from a source node to a target node based on constraint regions, in accordance with some embodiments.

FIG. 21 illustrates an example process 2100 for determining an optimal path from a source node to a target node based on constraint regions, in accordance with some embodiments. In some embodiments, some or all of process 2100 may be performed by TCNS 1951. In some embodiments, one or more other devices may perform some or all of process 2100 in concert with, and/or in lieu of, TCNS 1951.

Process 2100 may include receiving (at 2102) information associated with a node map, including costs and constraints associated with links between nodes of the node map. For example, as discussed above, one or more links may be associated with one or more constraints, which may be based on height restrictions, weight restrictions, "hard" constraints, "soft" constraints, etc.

Process 2100 may also include identifying (at 2104) a source node and a target node for which an optimal path is to be identified. For example, TCNS 1951 may receive an indication of a source node and a target node as part of a navigation request, as part of a witness search, and/or during some other procedure.

Process 2100 may include performing (at 2106) a search for the optimal path to the target node, including iteratively exploring links based on link costs and constraint regions. For example, as discussed above, TCNS 1951 may identify contiguous links with the same constraint as a constraint region. TCNS 1951 may perform a Djikstra search or some other type of search, in which links are iteratively explored from previously explored links. TCNS 1951 may iteratively explore the links in a manner that explores lower cost and/or less restrictive (e.g., where "less restrictive" refers to the fewest turns into constraint regions and/or otherwise having a lower constraint cost) links before exploring higher cost and/or more restrictive links.

Process 2100 may include determining (at 2108) that a path to the target node has been discovered via the search. If any potential paths to the target node, with a lower cost and/or fewer constraints (e.g., turns into constraint regions and/or other constraint costs, as discussed above), are possible (at 2110—YES), then TCNS 1951 may continue (at 2106) the search. If, on the other hand, no potential paths to the target node are possible, with a lower cost and/or fewer constraints (at 2110—NO), then TCNS 1951 may select (at 2112) the lowest cost and/or least restrictive path from the source node to the target node as the optimal path.

Figure 22:
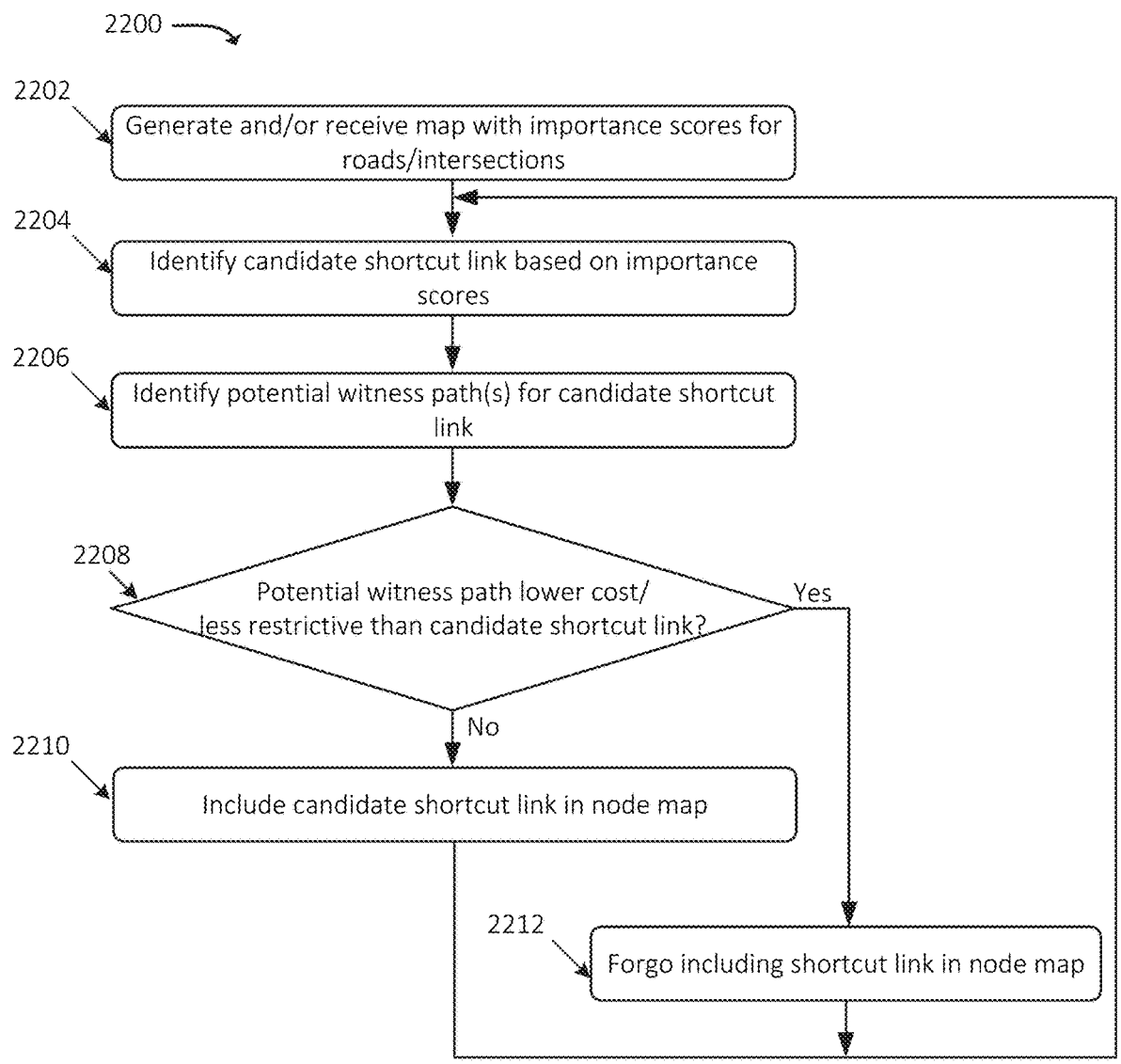
FIG. 22 illustrates an example process for determining whether to include a candidate shortcut link a node map based on constraint regions, in accordance with some embodiments.

FIG. 22 illustrates an example process 2200 for determining whether to include a candidate shortcut link a node map based on constraint regions, in accordance with some embodiments. In some embodiments, some or all of process 2200 may be performed by TCNS 1951. In some embodiments, one or more other devices may perform some or all of process 2200 in concert with, and/or in lieu of, TCNS 1951.

Process 2200 may include generating and/or receiving (at 2202) a map with priority scores for roads and/or intersections depicted in the map. For example, TCNS 1951 may receive a map (e.g., as similarly discussed above with respect to map 101). The map may be associated with roads and intersections, or other types of pathways. For example, in some embodiments, the map may be associated with pipelines, circuits, railway tracks, and/or other types of pathways that may be traversed. In some embodiments, TCNS 1951 may determine and/or may receive importance scores for some or all of the roads and/or intersections. As noted above, importance scores may be associated with one or more factors of the roads and/or intersections. For example, a road with a relatively "low" importance may be a relatively small road, may have a relatively small traffic volume, may be a residential road, and/or may have other suitable attributes. As another example, a road with a relatively "high" importance may be a relatively large road (e.g., a large quantity of lanes, a relatively long length, etc.), may have a relatively large traffic volume, may be a highway, and/or may have other suitable attributes.

Process 2000 may further include identifying (at 2204) a candidate shortcut link based on the importance scores. In some embodiments, TCNS 1951 may identify a candidate shortcut link based on one or more factors in addition to, or in lieu of, importance scores. For the sake of brevity, importance scores are discussed herein as the factor based on which candidate shortcut links are identified. For example, TCNS 1951 may identify one or more links (e.g., a single link or a series of links) with relatively low importance scores. For example, TCNS 1951 may identify one or more links with importance scores below a threshold, and/or may identify one or more links that have a lowest importance score (or set of importance scores) and that have not yet been analyzed. One or more nodes associated with such links may be contracted from the node map, and operations below may be used to determine whether to include one or more shortcuts, that represent paths through the contracted one or more nodes, in the node map. Some or all of process 2000 may be performed iteratively, and TCNS 1951 may perform iterations in a sequence that is based on ascending importance scores of links or sets of links. In some embodiments, TCNS 1951 may determine a cost for the candidate shortcut link, which may include identifying a link cost of the shortcut link and/or any constraints or constraint regions with which the shortcut link is associated.

Process 2000 may additionally include identifying (at 2206) one or more witness paths for the candidate shortcut link. For example, TCNS 1951 may identify one or more paths, which do not include a path through the candidate shortcut link, that have a lower cost than a candidate shortcut path. As noted above, the "candidate shortcut path" may include a path through the candidate shortcut link. In some embodiments, the candidate shortcut path may include only the shortcut link. As similarly noted above, the candidate shortcut link may be evaluated in a single direction, or in multiple directions.

Although not discussed here, situations may arise where a witness path is not identified for a given candidate shortcut link. In such situations, TCNS 1951 may add the candidate shortcut link to the node map. For example, the candidate shortcut link may be added, as the absence of a valid witness path may indicate that the shortcut link is an optimal path between the starting and ending nodes of the candidate shortcut link. For the sake of example, the description of process 2200 assumes that one or more candidate witness paths are found (at 2206) for the candidate shortcut link.

Process 2200 may also include determining (at 2208) whether any potential witness paths, that have a lower cost and/or are less restrictive than the candidate shortcut link, are found. For example, TCNS 1951 may perform one or more witness searches, as discussed above, which may include identifying costs and/or constraints associated with potential witness paths (e.g., based on whether such potential witness paths turn onto constraint regions, or other factors discussed above).

If no such potential witness path has a lower cost and/or is less restrictive than the candidate shortcut link (at 2210—NO), then TCNS 1951 may include (at 2010) the candidate shortcut link in the node map, as similarly described above. For example, such shortcut link may be included in the node map, as one or more situations may exist where traversing the shortcut link has a lower cost and/or is less restrictive than traversing the candidate witness path (e.g., based on identified cost regions with respect to the candidate witness path).

If on the other hand, one or more candidate witness paths have a lower cost and/or are less restrictive than the candidate shortcut link (at 2210—YES), then TCNS 1951 may forgo (at 2212) including the candidate shortcut link in the node map. For example, the candidate shortcut link may not be included in the node map, no situations may exist where the shortcut link has a lower cost and/or is less restrictive than the candidate shortcut link.

Figure 23:
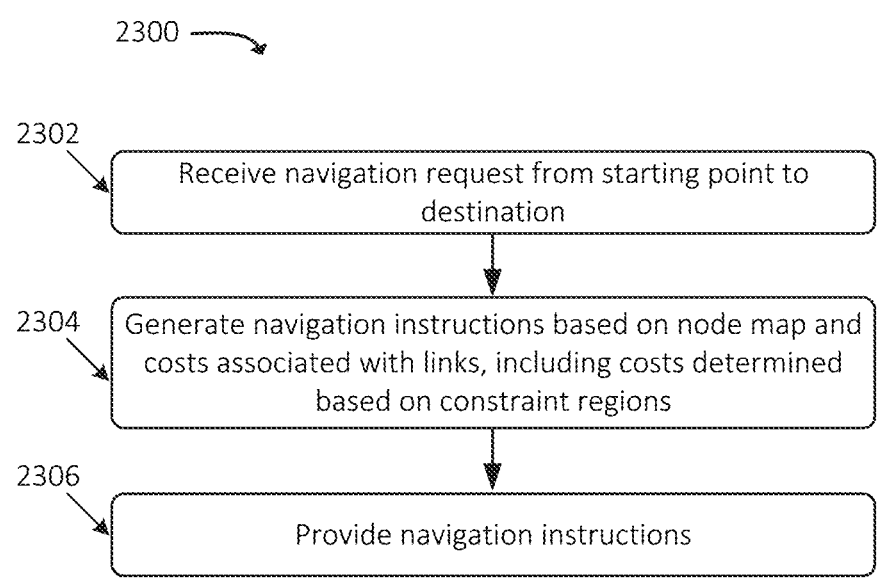
FIG. 23 illustrates an example process for using a node map, including constraint regions, to generate navigation instructions in response to a navigation request, in accordance with some embodiments.

FIG. 23 illustrates an example process 2300 for using a node map, including constraint regions, to generate navigation instructions in response to a navigation request, in accordance with some embodiments. In some embodiments, some or all of process 2300 may be performed by TCNS 1951. In some embodiments, one or more other devices may perform some or all of process 2300 in concert with, and/or in lieu of, TCNS 1951.

As shown, process 2300 may include receiving (at 2302) a navigation request. For example, TCNS 1951 may receive a request to navigate from a starting point that is associated with particular node, in a node map, to a destination that is associated with another node in the node map. As discussed above, the node map may include and/or may be associated with one or more link constraints, turn constraints, constraint regions, costs associated with links, etc. In some embodiments, the node map may be associated with other types of constraints, features, rules, etc., which may be evaluated in addition to the techniques described herein.

Process 2300 may further include generating (at 2304) navigation instructions based on the node map. For example, TCNS 1951 may use a bidirectional search or some other suitable type of search to identify one or more paths from the starting node to the ending node. For example, TCNS 1951 may perform one or more searches originating from the starting node and/or the ending node. In some embodiments, the bidirectional search may include identifying nodes or paths that have a higher importance score than a present node, and iteratively continuing to search for nodes or paths with higher importance score than the present node. In this manner, one or more paths originating from the starting node may intersect with one or more paths originating from the ending node, and TCNS 1951 may select a particular complete path (e.g., an intersection of a path originating from the starting node and a path originating from the ending node) based on cumulative cost and/or one or more other factors. As discussed above, the cost of a given path may be calculated based on whether such path or link includes one or more constraints and/or constraint regions.

Process 2300 may additionally include providing (at 2306) the navigation instructions. For example, TCNS 1951 may provide an indication of the path (determined at 2304) to a requesting device, such as UE 1901. UE 1901 may, in turn, present the navigation instructions via a display screen, audibly present the navigation instructions, or perform one or more other suitable operations to present the navigation instructions.

Figure 24:
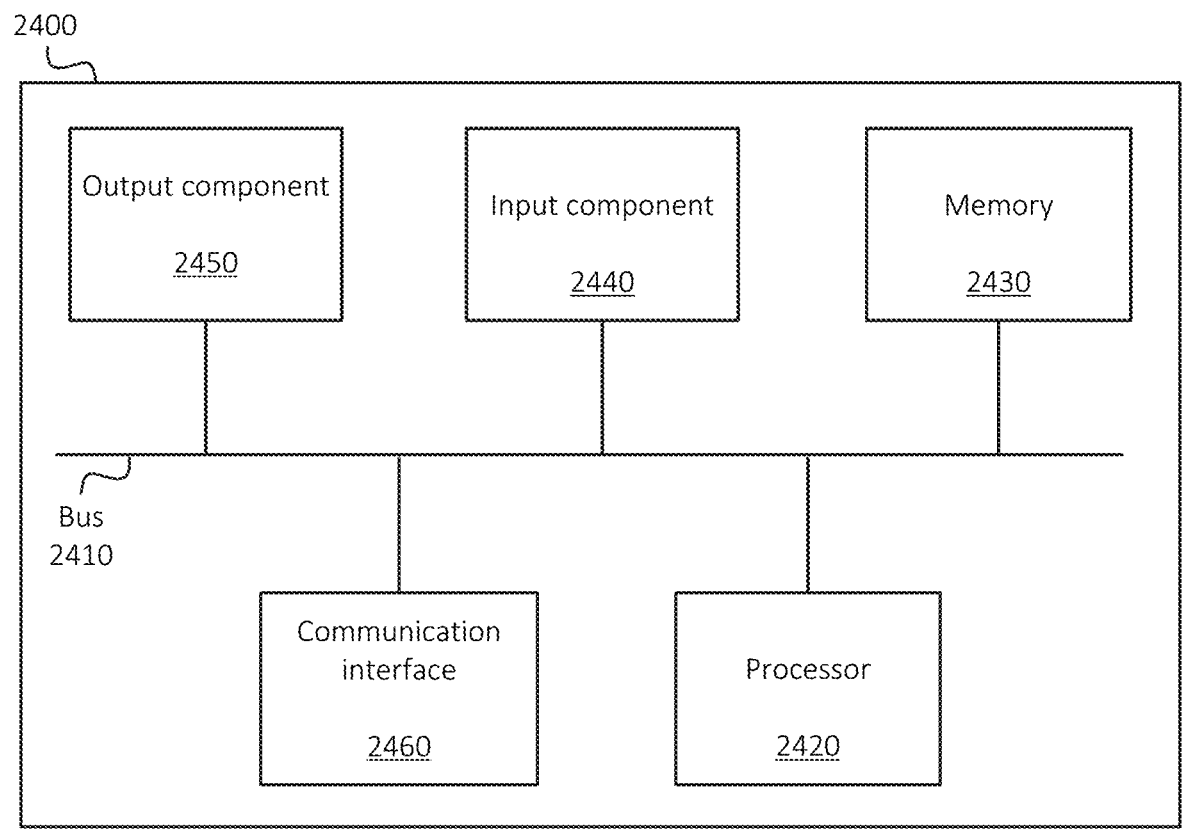
FIG. 24 illustrates example components of one or more devices, in accordance with one or more embodiments described herein.

FIG. 24 illustrates example components of device 2400. One or more of the devices described above may include one or more devices 2400. Device 2400 may include bus 2410, processor 2420, memory 2430, input component 2440, output component 2450, and communication interface 2460. In another implementation, device 2400 may include additional, fewer, different, or differently arranged components.

Bus 2410 may include one or more communication paths that permit communication among the components of device 2400. Processor 2420 may include a processor, microprocessor, or processing logic that may interpret and execute instructions. In some embodiments, processor 2420 may be or may include one or more hardware processors. Memory 2430 may include any type of dynamic storage device that may store information and instructions for execution by processor 2420, and/or any type of non-volatile storage device that may store information for use by processor 2420.

Input component 2440 may include a mechanism that permits an operator to input information to device 2400 and/or other receives or detects input from a source external to 2440, such as a touchpad, a touchscreen, a keyboard, a keypad, a button, a switch, a microphone or other audio input component, etc. In some embodiments, input component 2440 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 2450 may include a mechanism that outputs information to the operator, such as a display, a speaker, one or more light emitting diodes ("LEDs"), etc.

Communication interface 2460 may include any transceiver-like mechanism that enables device 2400 to communicate with other devices and/or systems. For example, communication interface 2460 may include an Ethernet interface, an optical interface, a coaxial interface, or the like. Communication interface 2460 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 2400 may include more than one communication interface 2460. For instance, device 2400 may include an optical interface and an Ethernet interface.

Device 2400 may perform certain operations relating to one or more processes described above. Device 2400 may perform these operations in response to processor 2420 executing software instructions stored in a computer-readable medium, such as memory 2430. A computer-readable medium may be defined as a non-transitory memory device. A memory device may include space within a single physical memory device or spread across multiple physical memory devices. The software instructions may be read into memory 2430 from another computer-readable medium or from another device. The software instructions stored in memory 2430 may cause processor 2420 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-18 and 21-23), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
      receive a node map that includes a plurality of links between respective nodes of the node map;
      maintain a data structure that includes:
         a respective link cost for each link of the plurality of links of the node map, and
         a particular constraint identifier for a particular subset of links of the plurality of links,
         wherein each link of the particular subset of links is associated with a respective link cost and the particular constraint identifier,
         wherein one or more other links of the plurality of links, which are not in the particular subset of links, are not associated with the particular constraint identifier;
      identify that the particular subset of links are contiguous links in the node map, wherein the particular subset of links are associated with a particular constraint region based on identifying that the particular subset of links are contiguous links in the node map and further based on the data structure including the particular constraint identifier for each link of the particular subset of links;
      receive a navigation request, provided via a navigation system, that specifies a starting point and a destination;
      identify a source node in the node map based on the starting point;
      identify a target node in the node map based on the destination,
         wherein a first link exiting the source node and a second link entering the target node are included in the particular subset of links associated with the constraint region;
      perform a search from the source node to the target node, wherein performing the search includes:
         identifying a first candidate path between the source node and the target node, wherein all links of the first candidate path are in the particular subset of links,
         identifying that the first candidate path does not exit the constraint region based on identifying that all links of the first candidate path are in the particular subset of links that are associated with the particular constraint identifier,
         identifying a second candidate path between the source node and the target node, wherein at least one link of the second candidate path is not in the particular subset of links,
         identifying that the second candidate paths exits and re-enters the constraint region based on identifying that at least one link of the second path is not in the particular subset of links;
         computing a first cost for the first candidate path, wherein computing the first cost includes applying the particular constraint cost based on the first candidate path starting within the constraint region, and
         initiating a determination of a second cost for the second candidate path, after computing the cost for the first candidate path, wherein initiating the determination for the second cost includes:
            applying the particular constraint cost based on the second candidate path starting within the constraint region,
            initiating a traversal of the second candidate path,
            additionally applying, based on traversing the second candidate path, the particular constraint cost based on exiting the constraint region, and
            ceasing traversal of the second candidate path, without performing a full traversal of the second candidate path, based on identifying that the second candidate path is associated with the additionally applied particular constraint cost as compared to the first candidate path;
      select the first candidate path as a path from the source node to the target node, based on identifying that determination of the second cost for the second candidate path ceased based on determining that the second candidate path includes the additionally applied particular constraint cost; and
      output, to the navigation system and in response to the navigation request, the first candidate path.

2. The device of claim 1, wherein the particular subset of links further include a third link and a fourth link that are contiguous links, wherein the first candidate path traverses the third link and the fourth link, wherein the one or more processors are further configured to:
   determine that the third and fourth links are both associated with the same particular constraint region; and
   forgo, based on determining that the third and fourth links are both associated with the same particular constraint region, determining that a turn of the first candidate path from the third link to the fourth link incurs the particular constraint cost.

3. The device of claim 1, wherein the selected first candidate path is associated with a higher cumulative link cost than a cumulative link cost of the second candidate path.

4. The device of claim 1, wherein traversal of the second candidate path, without performing a full traversal of the second candidate path, is ceased independently of link costs associated with respective links included in the first candidate path and the second candidate path.

5. The device of claim 1, wherein the navigation system includes a device that is connected to a network.

6. The device of claim 1, wherein outputting the first candidate path to the navigation system includes outputting the first candidate path to a navigation system installed in a vehicle.

7. The device of claim 1, wherein applying the second cost includes applying the particular constraint cost more times than the particular constraint cost is applied when computing the first cost.

8. A non-transitory computer-readable medium, storing a plurality of processor-executable instructions to:
receive a node map that includes a plurality of links between respective nodes of the node map;
maintain a data structure that includes:
  a respective link cost for each link of the plurality of links of the node map, and
  a particular constraint identifier for a particular subset of links of the plurality of links,
  wherein each link of the particular subset of links is associated with a respective link cost and the particular constraint identifier,
  wherein one or more other links of the plurality of links, which are not in the particular subset of links, are not associated with the particular constraint identifier;
identify that the particular subset of links are contiguous links in the node map, wherein the particular subset of links are associated with a particular constraint region based on identifying that the particular subset of links are contiguous links in the node map and further based on the data structure including the particular constraint identifier for each link of the particular subset of links;
receive a navigation request, provided via a navigation system, that specifies a starting point and a destination;
identify a source node in the node map based on the starting point;
identify a target node in the node map based on the destination,
  wherein a first link exiting the source node and a second link entering the target node are included in the particular subset of links associated with the constraint region;
perform a search from the source node to the target node, wherein performing the search includes:
  identifying a first candidate path between the source node and the target node, wherein all links of the first candidate path are in the particular subset of links,
  identifying that the first candidate path does not exit the constraint region based on identifying that all links of the first candidate path are in the particular subset of links that are associated with the particular constraint identifier,
  identifying a second candidate path between the source node and the target node, wherein at least one link of the second candidate path is not in the particular subset of links,
  identifying that the second candidate paths exits and re-enters the constraint region based on identifying that at least one link of the second path is not in the particular subset of links;
  computing a first cost for the first candidate path, wherein computing the first cost includes applying the particular constraint cost based on the first candidate path starting within the constraint region, and
  initiating a determination of a second cost for the second candidate path, after computing the cost for the first candidate path, wherein initiating the determination for the second cost includes:
    applying the particular constraint cost based on the second candidate path starting within the constraint region,
    initiating a traversal of the second candidate path,
    additionally applying, based on traversing the second candidate path, the particular constraint cost based on exiting the constraint region, and
    ceasing traversal of the second candidate path, without performing a full traversal of the second candidate path, based on identifying that the second candidate path is associated with the additionally applied particular constraint cost as compared to the first candidate path;
  select the first candidate path as a path from the source node to the target node, based on identifying that determination of the second cost for the second candidate path ceased based on determining that the second candidate path includes the additionally applied particular constraint cost; and
  output, to the navigation system and in response to the navigation request, the first candidate path.

9. The non-transitory computer-readable medium of claim 8, wherein the particular subset of links further include a third link and a fourth link that are contiguous links, wherein the first candidate path traverses the third link and the fourth link, wherein the plurality of processor-executable instructions further include processor-executable instructions to:
  determine that the third and fourth links are both associated with the same particular constraint region; and
  forgo, based on determining that the third and fourth links are both associated with the same particular constraint region, determining that a turn of the first candidate path from the third link to the fourth link incurs the particular constraint cost.

10. The non-transitory computer-readable medium of claim 8, wherein the selected first candidate path is associated with a higher cumulative link cost than a cumulative link cost of the second candidate path.

11. The non-transitory computer-readable medium of claim 8, wherein traversal of the second candidate path, without performing a full traversal of the second candidate path, is ceased independently of link costs associated with respective links included in the first candidate path and the second candidate path.

12. The non-transitory computer-readable medium of claim 8, wherein outputting the first candidate path to the navigation system includes outputting the first candidate path to a navigation system installed in a vehicle.

13. The non-transitory computer-readable medium of claim 8, wherein applying the second cost includes applying the particular constraint cost more times than the particular constraint cost is applied when computing the first cost.

14. A method, comprising:
receiving a node map that includes a plurality of links between respective nodes of the node map;
maintaining a data structure that includes:
  a respective link cost for each link of the plurality of links of the node map, and
  a particular constraint identifier for a particular subset of links of the plurality of links,
  wherein each link of the particular subset of links is associated with a respective link cost and the particular constraint identifier,
  wherein one or more other links of the plurality of links, which are not in the particular subset of links, are not associated with the particular constraint identifier;

identifying that the particular subset of links are contiguous links in the node map, wherein the particular subset of links are associated with a particular constraint region based on identifying that the particular subset of links are contiguous links in the node map and further based on the data structure including the particular constraint identifier for each link of the particular subset of links;

receiving a navigation request, provided via a navigation system, that specifies a starting point and a destination;

identifying a source node in the node map based on the starting point;

identifying a target node in the node map based on the destination,
  wherein a first link exiting the source node and a second link entering the target node are included in the particular subset of links associated with the constraint region;

performing a search from the source node to the target node, wherein performing the search includes:
  identifying a first candidate path between the source node and the target node, wherein all links of the first candidate path are in the particular subset of links,
  identifying that the first candidate path does not exit the constraint region based on identifying that all links of the first candidate path are in the particular subset of links that are associated with the particular constraint identifier,
  identifying a second candidate path between the source node and the target node, wherein at least one link of the second candidate path is not in the particular subset of links,
  identifying that the second candidate paths exits and re-enters the constraint region based on identifying that at least one link of the second path is not in the particular subset of links;
  computing a first cost for the first candidate path, wherein computing the first cost includes applying the particular constraint cost based on the first candidate path starting within the constraint region;
  initiating a determination of a second cost for the second candidate path, after computing the cost for the first candidate path, wherein initiating the determination for the second cost includes:
    applying the particular constraint cost based on the second candidate path starting within the constraint region,
    initiating a traversal of the second candidate path,
    additionally applying, based on traversing the second candidate path, the particular constraint cost based on exiting the constraint region, and
    ceasing traversal of the second candidate path, without performing a full traversal of the second candidate path, based on identifying that the second candidate path is associated with the additionally applied particular constraint cost as compared to the first candidate path;
  selecting the first candidate path as a path from the source node to the target node, based on identifying that determination of the second cost for the second candidate path ceased based on determining that the second candidate path includes the additionally applied particular constraint cost;
  outputting, to the navigation system and in response to the navigation request, the first candidate path.

15. The method of claim 14, wherein the particular subset of links further include a third link and a fourth link that are contiguous links, wherein the first candidate path traverses the third link and the fourth link, wherein the method further comprises:
  determining that the third and fourth links are both associated with the same particular constraint region; and
  forgoing, based on determining that the third and fourth links are both associated with the same particular constraint region, determining that a turn of the first candidate path from the third link to the fourth link incurs the particular constraint cost.

16. The method of claim 14, wherein the selected first candidate path is associated with a higher cumulative link cost than a cumulative link cost of the second candidate path.

17. The method of claim 14, wherein traversal of the second candidate path, without performing a full traversal of the second candidate path, is ceased independently of link costs associated with respective links included in the first candidate path and the second candidate path.

18. The method of claim 14, wherein the navigation system includes a device that is connected to a network.

19. The method of claim 14, wherein the navigation system is installed in a vehicle.

20. The method of claim 14, wherein applying the second cost includes applying the particular constraint cost more times than the particular constraint cost is applied when computing the first cost.

* * * * *